United States Patent
Jadhav

(10) Patent No.: US 10,536,558 B2
(45) Date of Patent: Jan. 14, 2020

(54) PLATFORM AGNOSTIC MODULAR FRAMEWORK

(71) Applicant: Ajay Jadhav, New York, NY (US)

(72) Inventor: Ajay Jadhav, New York, NY (US)

( * ) Notice: Subject to any disclaimer, the term of this patent is extended or adjusted under 35 U.S.C. 154(b) by 102 days.

(21) Appl. No.: 14/426,705

(22) PCT Filed: Sep. 11, 2013

(86) PCT No.: PCT/US2013/059160
§ 371 (c)(1),
(2) Date: Mar. 6, 2015

(87) PCT Pub. No.: WO2014/043175
PCT Pub. Date: Mar. 20, 2014

(65) Prior Publication Data
US 2015/0244837 A1 Aug. 27, 2015

Related U.S. Application Data

(60) Provisional application No. 61/699,467, filed on Sep. 11, 2012.

(51) Int. Cl.
*H04L 29/06* (2006.01)
*H04L 29/08* (2006.01)
(Continued)

(52) U.S. Cl.
CPC .......... *H04L 67/42* (2013.01); *H04L 12/6418* (2013.01); *H04L 12/66* (2013.01);
(Continued)

(58) Field of Classification Search
CPC ............................ H04L 67/42; H04L 12/6418
(Continued)

(56) References Cited

U.S. PATENT DOCUMENTS 8,161,275 B1 4/2012 Woodward
2007/0250930 A1 10/2007 Aziz et al.
(Continued)

FOREIGN PATENT DOCUMENTS

EP 2895960 A2 7/2015
WO 01/14961 A2 3/2001
(Continued)

OTHER PUBLICATIONS

Wikipedia, "Chrome Web Store", Nov. 24, 2016, en.wikipedia.org (3 pages).*
(Continued)

*Primary Examiner* — Wing F Chan
*Assistant Examiner* — Leon Y Tseng
(74) *Attorney, Agent, or Firm* — Wiley Rein LLP

(57) ABSTRACT

Data systems and processes are disclosed that are capable of providing a modular framework for accessing and manipulating information across multiple device platforms synchronously. The system includes a server-side module repository including at least one module, a subscription service configured to be implemented through a client graphical user interface (GUI) of the multiple device platforms that provides access to interact and navigate the at least one module, and an architecture that allows the at least one module to delegate at least part of a computing task to the server side.

14 Claims, 25 Drawing Sheets

(51) Int. Cl.
*H04L 12/64* (2006.01)
*H04L 12/66* (2006.01)

(52) U.S. Cl.
CPC .......... *H04L 67/02* (2013.01); *H04L 67/1095* (2013.01); *H04L 67/306* (2013.01)

(58) Field of Classification Search
USPC ....................................................... 709/203
See application file for complete search history.

(56) References Cited

U.S. PATENT DOCUMENTS

| | | | |
|---|---|---|---|
| 2008/0313632 | A1 | 12/2008 | Kumar et al. |
| 2012/0066296 | A1* | 3/2012 | Appleton ............... G06Q 30/02 709/203 |
| 2012/0166538 | A1 | 6/2012 | Son et al. |
| 2013/0036057 | A1* | 2/2013 | Hendrix ................ G06F 21/645 705/65 |

FOREIGN PATENT DOCUMENTS

| | | |
|---|---|---|
| WO | 01/81829 A1 | 11/2001 |
| WO | 2014/043175 A2 | 3/2014 |

OTHER PUBLICATIONS

Wikipedia, "Web Application", Dec. 20, 2016, en.wikipedia.org (6 pages).*
Warren, The New York Times Chrome Web App Remodels the Online Newspaper, Dec. 7, 2010, mashable.com (3 pages).*
The Times's Digital Subscription Plan, Mar. 23, 2011, nytimes.com (15 pages).*
Rogers, Google Chrome: How to Uninstall Web Store Apps, Dec. 9, 2010, tech-recipes.com (2 pages).*
Siegler, Google Details Chrome's Background Feature: Run Web Apps Without Seeing Them, Feb. 23, 2011, techcrunch.com (2 pages).*
Jacobson, Node.js for beginners—Callbacks, Mar. 5, 2012, theprojectspot.com (12 pages).*
International Search Report, dated Mar. 18, 2014, and cited in related International Application No. PCT/US2013/059160, filed Sep. 11, 2013.
Anonymous, "Web Application," Wikipedia, Aug. 8, 2012 (Aug. 8, 2012) XP055476898, retrieved from the Internet: URL: https://web.archive.org/web/20120829175748/https://en.wikipedia.org/wiki/Web_application[18-05-2018 16:08:47].
EPO Communication Pursuant to Article 94(3) EPC mailed, May 25, 2018, in related European Patent Application No. 13838009.2, filed Sep. 11, 2013.
Examination Report No. 1 dated Mar. 22, 2018, in related Australian Patent Application No. 2013315670, filed Sep. 11, 2013.
Extended European Search Report dated Apr. 25, 2016, in related European Patent Application No. 13838009.2, filed Sep. 11, 2013.
International Preliminary Report on Patentability dated Mar. 26, 2015, in related International Patent Application No. PCT/US2013/059160, filed Sep. 11, 2013.
Written Opinion dated Mar. 18, 2014, in related International Patent Application No. PCT/US2013/059160, filed Sep. 11, 2013.
Office Action received for European Patent Application No. 13838009.2, dated Sep. 5, 2019, 9 pages.

* cited by examiner

PLATFORM AGNOSTIC MODULAR FRAMEWORK

FIELD OF THE INVENTION

The invention relates to data systems capable of providing a modular framework for accessing and manipulating information across multiple device platforms synchronously.

BACKGROUND OF THE INVENTION

Computing devices, such as personal computers, mobile smartphones, personal digital assistants, tablets, televisions, digital glasses, video game systems, digital projection systems, and holographic display systems, can be used to view various kinds of computer stored data such as computer generated documents stored on digital media, scanned documents generated on external sources and then digitized and stored on digital media, and photographic images captured on various devices and then stored on digital media. Displaying various kinds of documents on computing device screens or on printed media may involve disparate and incompatible operating systems (OSs), which would require native applications specific to each OS, and sometimes specific to each device, in order to interact with the digitally stored data in a visual format.

This OS incompatibility can result in end users having to buy separate applications for each different category of devices, e.g., an application specific for a PC plus an application specific for a mobile device. In this regard, to access and manipulate a document across different device platforms, an end user must buy or download an application for each category of device utilized. In some cases, a user is required to buy or download two applications for the same category of device, e.g., an application specific for an Android device and an application specific for an iOS smartphone. While some envision mobile devices replacing desktop computing at some point in the future, the average consumer today continues to make use of various computing devices with different operating systems, such as personal computers (laptops and desktops), video game systems (Sony's PlayStation or Microsoft's Xbox) and other proprietary devices with native OSs. This situation also remains a burden to software developers, who, in order to address the widest potential market for their product, must spend the time, resources and money to develop their same basic application to run separately and specifically on each different device or platform.

With the advent of cloud computing, an extra wrinkle to the already challenging equation of accessing digitally stored data over the Internet has been created—that of efficiently retrieving and storing digital data on the cloud.

Apple's iOS and Google's Android OS currently dominate the world of mobile device OS, followed by Nokia, RIM's Blackberry, Microsoft's Windows Mobile and others. Although each mobile OS is different from an operations standpoint, they all share a common trait—their proprietary nature from both an internal architecture, as well as, the external applications (Apps) required for consumers to interact with the devices running on the OSs.

A huge drawback of the current state of mobile computing is the lack of computational support from the server side. Although mobile devices have increased their capacity to serve and process data in the last couple of years, computing large tasks on mobile devices is still very costly; and it often requires cellular/wireless carrier subsidies to make the products affordable on the front-end and then through ongoing enhancements, new feature sets, improved processing power and other design feature or operational improvements, it creates frequent upgrade cycles.

SUMMARY OF THE INVENTION

The various embodiments of the invention disclosed here include the use of innovative data systems some of which may consist of two parts: a server-side module repository and a subscription service through a client graphical user interface (GUI) that provides access to interact and navigate various modules of the system/application. The system may utilize a unique architecture that allows every module within the application to delegate part of or the entire computing task to the server side. It then delivers the result(s) to the caller (user) on the mobile device upon the completion of the assigned task. This process reduces the hardware computing power on the client (mobile) side, creating an additional benefit of increased battery life.

One important distinction of this system architecture as opposed to traditional iOS or Android platforms is that modules in the presently disclosed system act as counterparts of applications in the traditional systems. Since this application (system) on the client side runs within a browser, the modules are downloaded at runtime, and thus, can be uploaded or downloaded on demand provided that the user has subscribed to these modules and are in possession of valid subscription. Modules, like data, can be requested and discarded at runtime from the cloud if desired.

A similar logic applies to the functionality within the module or within a sub-module, which can combine to constitute a module. Modules can also be embedded within another module. For example, one user can send an email with an embedded calendar grid with a meeting request further contained within the calendar. The recipient of the meeting request does not need to open up another program or application, but can simply accept/decline/reject or request an alternate time. This request can then be fulfilled on demand in real time without the recipient having to exit the email program or to reopen the calendar program; this happens all within the browser environment. Modules running within a browser using Canvas and a cloud-distributed database have the potential to bring down costs of operation in addition to dramatically improving productivity.

In a gaming platform, e.g., as described in U.S. patent application Ser. No. 61/602,241, graphical shapes contained on all collaborating user screens will respond to the actions of all users concurrently. This may allow the system to run collaborative online games with social media interaction, or allow remote media playback in a social setting, etc.

Among other things, techniques and systems are disclosed for providing a Canvas-based graphical user interface that enables user navigation through the selection of available modules, which interact for the creation, the acquisition, the receipt or the modification of content.

BRIEF DESCRIPTION OF THE DRAWINGS

The accompanying drawings, which are included to provide a further understanding of the invention and are incorporated in and constitute a part of this specification, illustrate exemplary embodiments of the invention that together with the description serve to explain the principles of the invention.

Video mode view—left top panel contains description of playlist; in the play mode, the left panel rotates and plays the video—this panel also has the ability to expand and encompass the whole screen available to the application; the left bottom panel contains controls; the middle panel contains the details of the song being played, album, release year, artist, etc.—this panel rotates and displays the list of songs in the playlist; the right panel contains social interaction, comments, recommendations, earning credits, etc.

Figure 19:
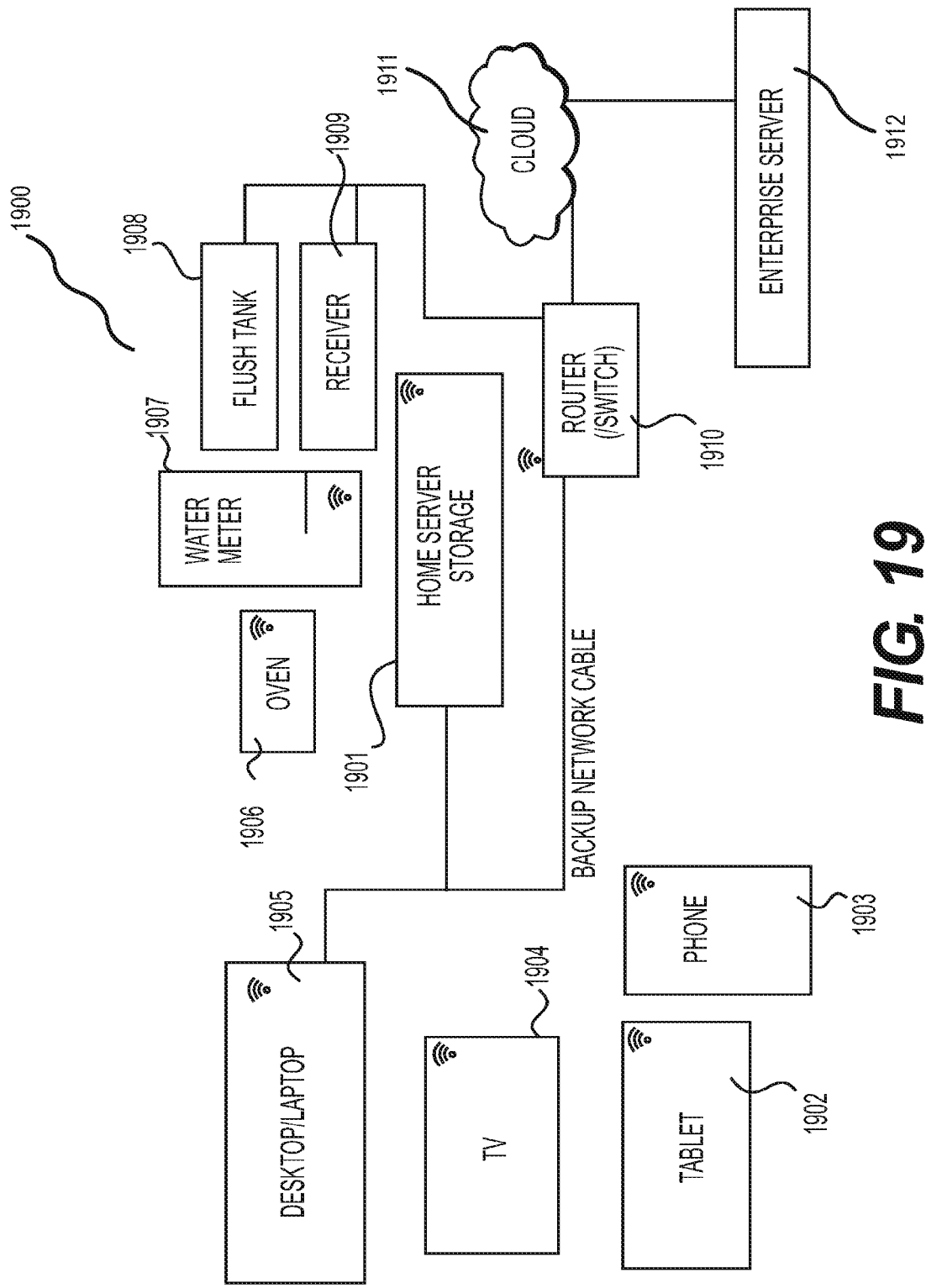

FIG. 19—Home Device Setup.

Figure 20:
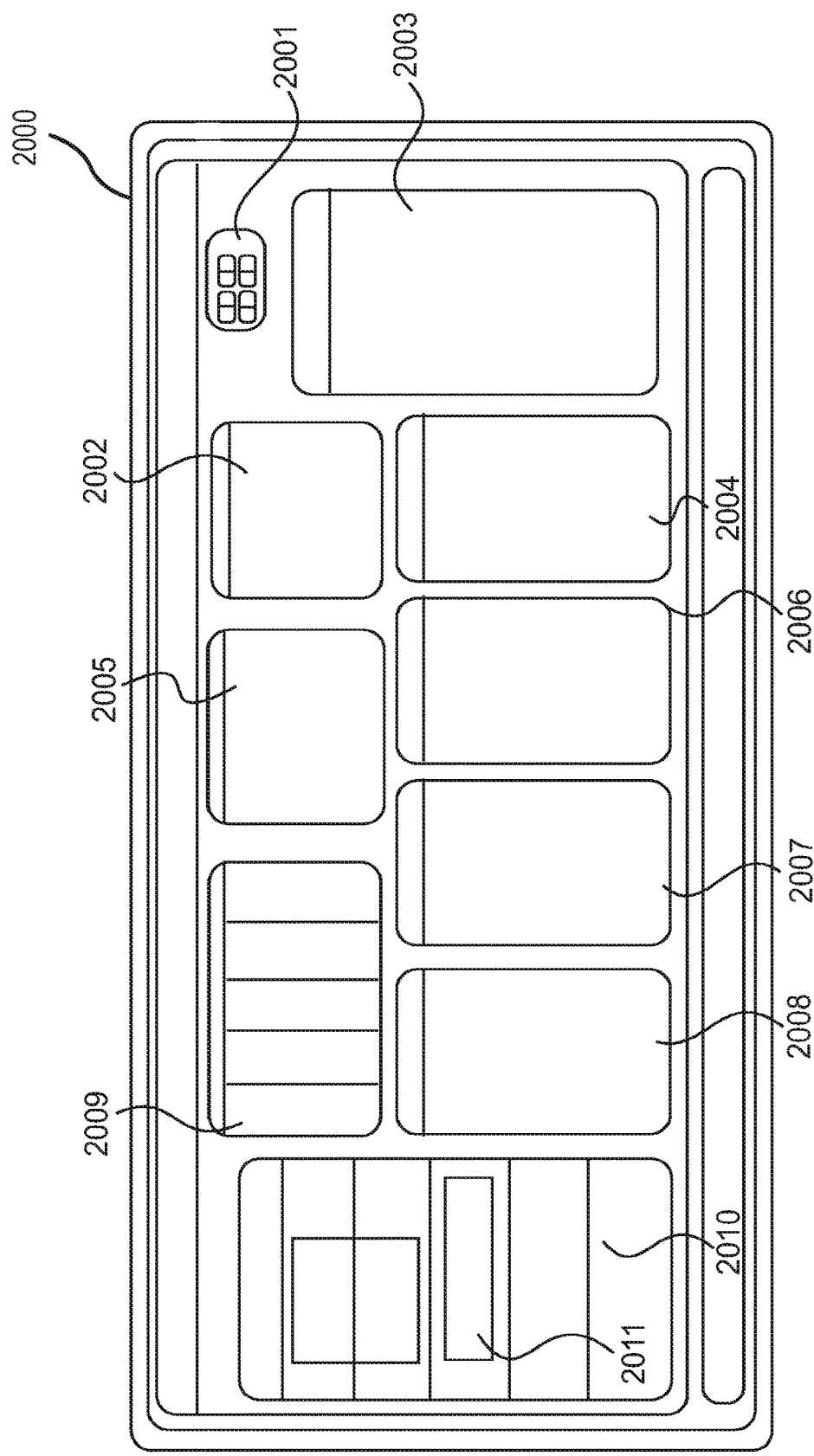

FIG. 20—Calendar Daily view (Laptop/Desktop form factor).

Figure 21:
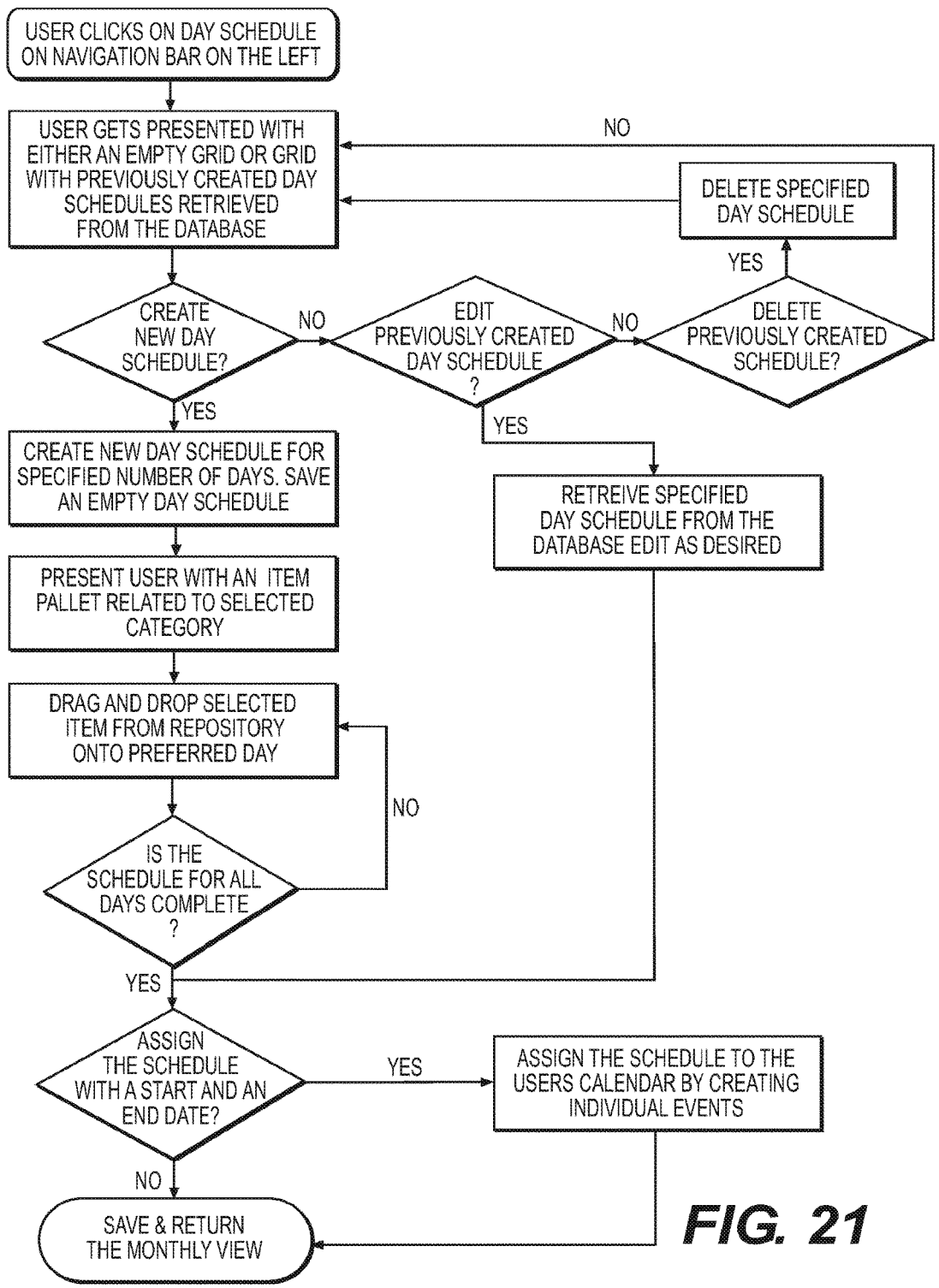

FIGS. 21—Process flow for creating and editing a Day Schedule.

Figure 22:
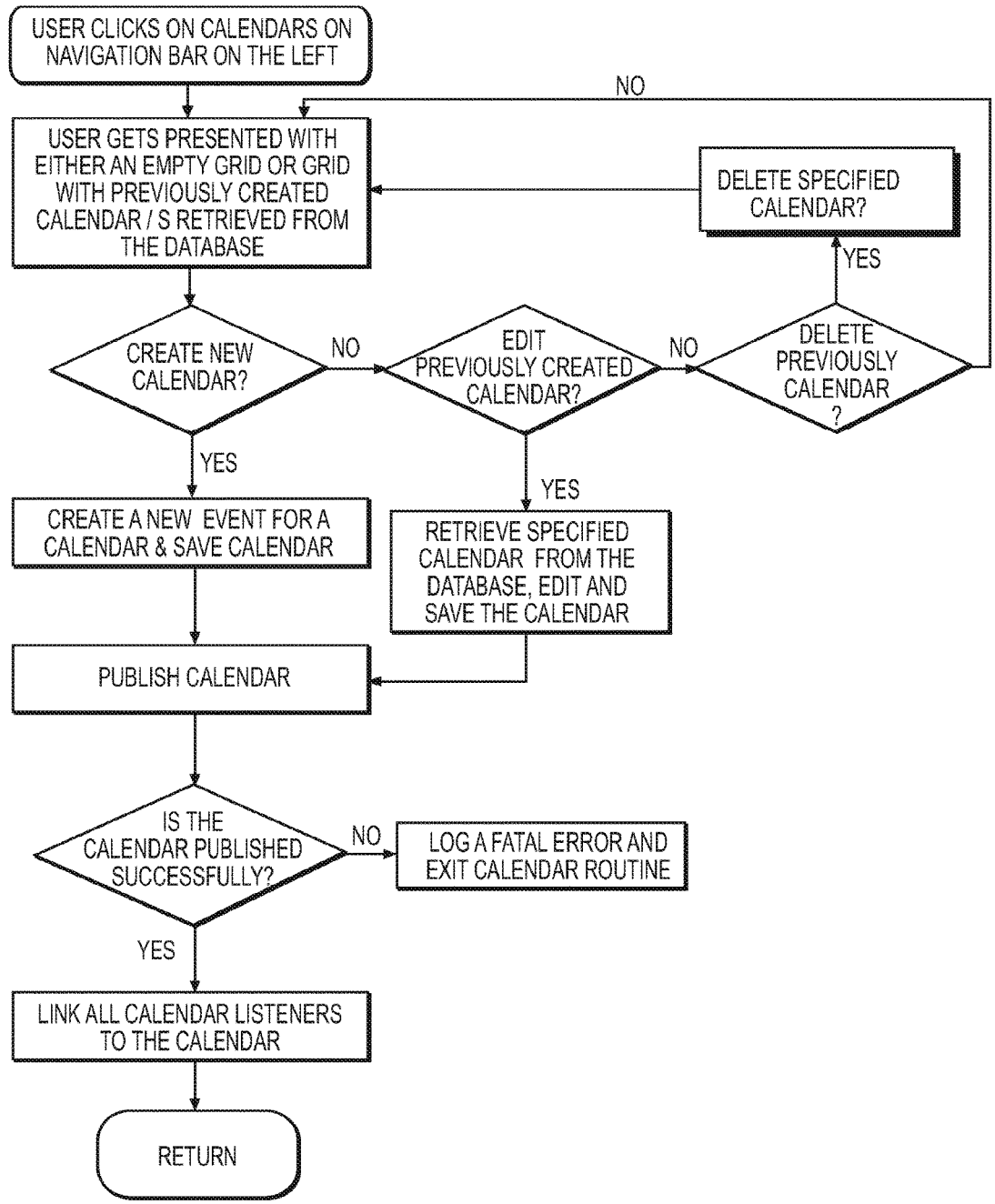

FIGS. 22—Process flow for creating and editing a Day Schedule.

Figure 23:
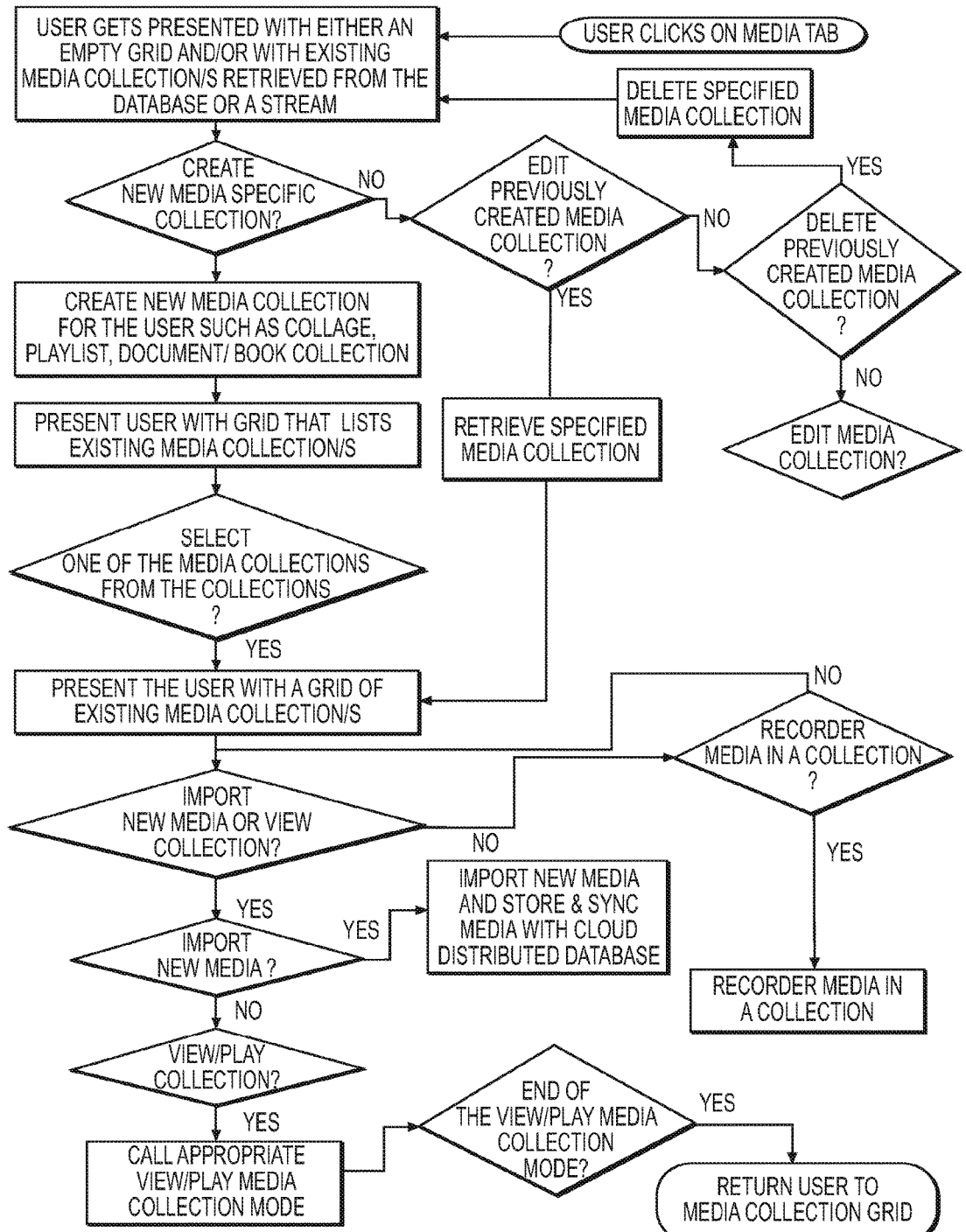

FIG. 23—Process Flow for creating or editing a media collection.

Figure 24:
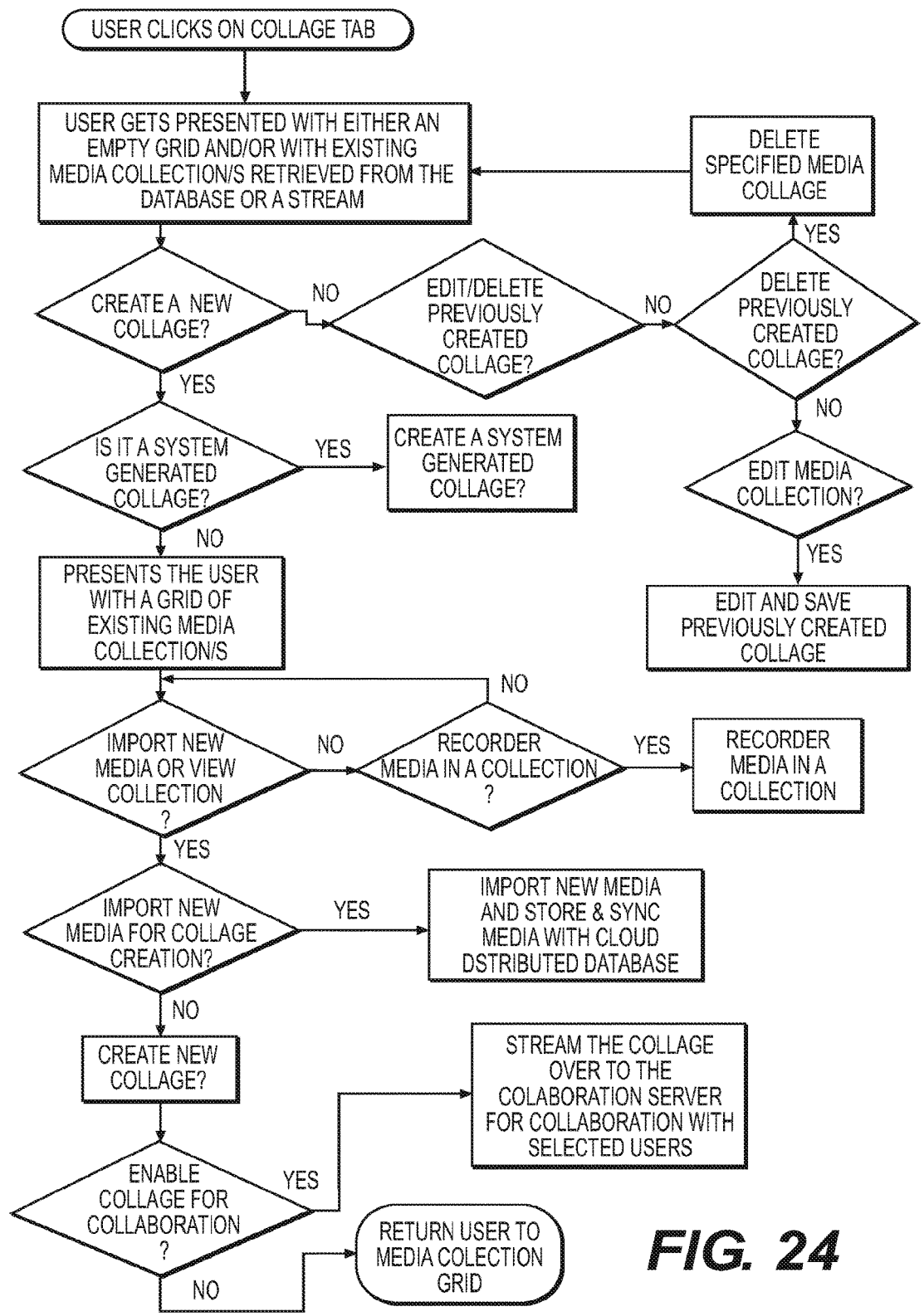

FIG. 24—Process Flow for creating or editing a Collage.

Figure 25:
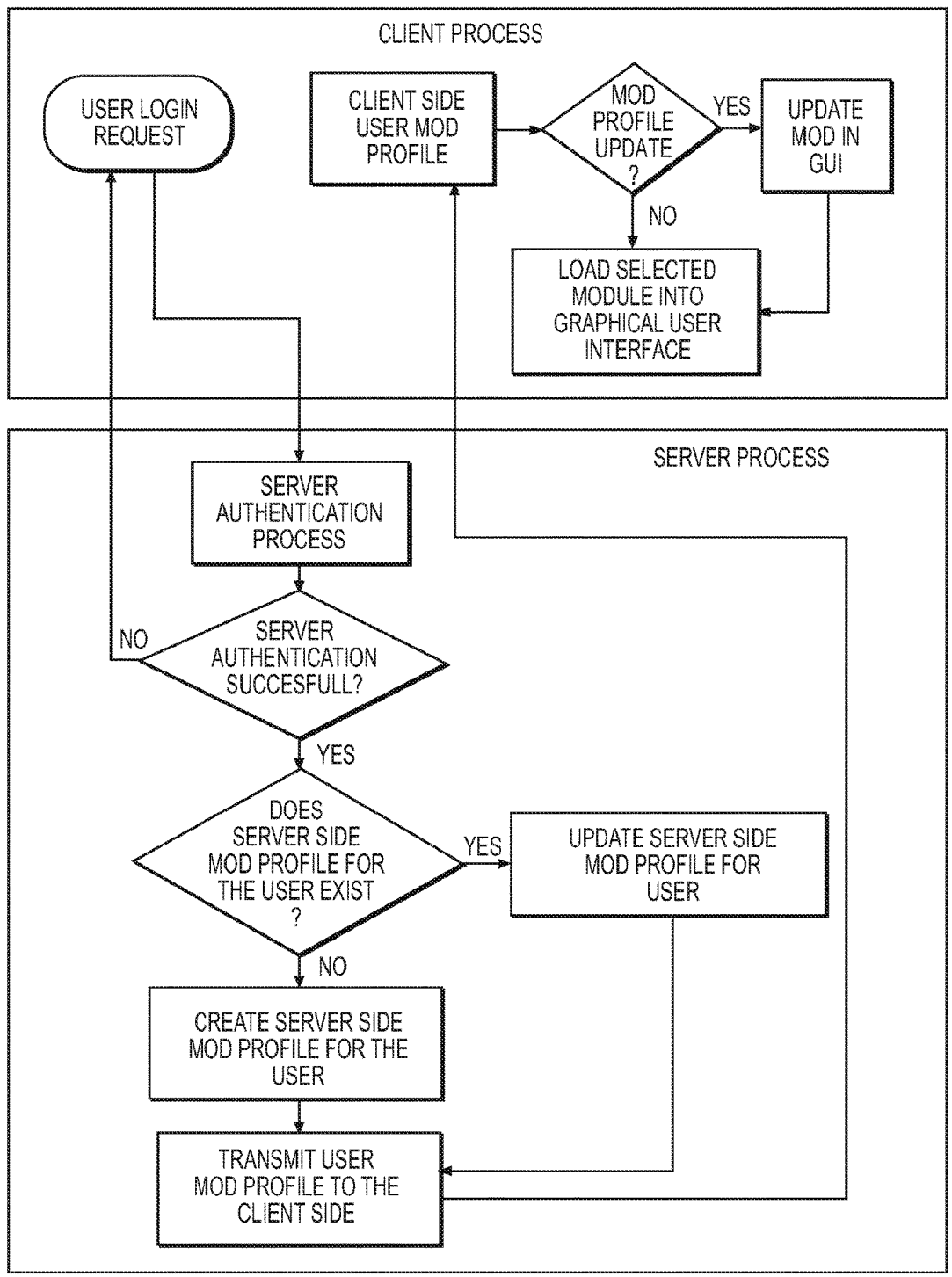

FIG. 25—Process Flow for loading or updating a Module.

DETAILED DESCRIPTION OF THE INVENTION

The present invention is not limited to the particular methodology, compounds, materials, manufacturing techniques, uses, and applications described herein, as these may vary. The terminology used herein is used for the purpose of describing particular embodiments only, and is not intended to limit the scope of the present invention. The singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

The terms "synchronous" or "synchronously" or "synchronize" as used here does not refer to only a characteristic or action relating to a set of events occurring at the same time, coinciding in time, contemporaneous, or simultaneous. No temporal limitation is meant by these terms as used here. Rather, these terms are intended to refer to the correspondence of the same, equivalent, or similar information or data across various, possibly the same or disparate, devices or device platforms, whether or not occurring at the same time, coinciding in time, contemporaneous, or simultaneous.

All patents and other publications identified are incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason.

With the proliferation of smartphones and embedded OSs in household appliances, lighting fixtures/systems, electric and water meters, environmental control systems, audio and video equipment, solar panels, smart glass, etc., the need for storage and the navigation of data from all of these devices has dictated rapid growth rates in the last decade of both storage capacity and techniques in the navigation of the stored data.

An embodiment of the invention, as depicted in FIG. 19, is a home device system with various devices and equipment connected to a home network with the home server storage or central server (1901) acting as a optionally cached client copy as described in U.S. patent application Ser. No. 13/565,171. The setup, while efficient, may raise three challenges: two on the client side and one on the server side, such as massive amounts of data storage requirements, the requirement of a tool for navigating this data, and a rule-based decision driven system on the server side.

As U.S. patent application Ser. No. 13/565,171 suggests, by making use of a local data store feature offered by new browser standards as part of the HTML5 specification, or by providing a copy of the client cache for devices and OSs that either do not have a HTML5 compatible browser or do not have the ability to run a HTML 5 compatible browser, the above-mentioned challenges can be resolved by delivering massive amounts of data or parts of it to the end user through an efficient, user-friendly framework.

In an embodiment of the invention, the system for storing and navigating the data may include a cloud distributed database system, which accomplishes the following: Data Processing, Data Navigation, Intelligent Data Storage, Data Sync and Replication, Data Aggregation, and System and User Specific Data Conflict Resolution.

With the advent of touch sensitive devices and motion/gesture detecting devices, a fundamental change in terms of design principles regarding user interfaces has developed. For example, U.S. patent application Ser. No. 61/602,241 describes a system to achieve an efficient and user-friendly method of presenting data on mobile phones and tablets utilizing either touch screens or motion/gesture detecting devices.

In order to deal with disparate and mutually incompatible OSs and applications that are in use today, the various embodiments of the invention may make use of a suitable browser that functions across different Oss. This Browser could deliver/render cloud/web content in a mostly uniform fashion based on W3C standards. In instances where a Browser may not be suitable, native application programs that are specifically designed for the rendering of content from the system may be used.

In an embodiment of the invention, the system may make use of Canvas, the HTML5 element in a Browser, as a rendering system with all of its W3C specified functionality together with customized functionality specific to certain platforms. The application provides an intuitive and intelligent interactive GUI by making use of the Canvas element in a standard Internet browser. In essence, the proposed system makes use of the Browser as a sandbox, thus operating within its confines. This, in turn, provides Application Programming Interfaces ("APIs") that are confined to working within the Browsers, thereby making all applications written with these APIs compatible regardless of the OS. This approach allows the end consumer to procure only one application that can operate across various OS boundaries, as opposed to having to procure applications specific to each device and/or various OSs. Further, the end consumer would never be required to "upgrade," since the proposed system has no application stored locally, thus, eliminating the need for an upgrade of a native application. An example would be using a Word Processor. Currently, the end consumer would need to procure a specific application for each and every unique device they own, such as Windows PC, Apple Mac, iOS, Android, WebOS, etc. In this regard, the end consumer would simply need to access this system, which contains the application module, through the Browser.

In order to efficiently manage and process the vast amounts of data, the various embodiments of the invention may categorize the data/content into various groups—similar to how a person would organize paper documents into files, folders, boxes and then into either cabinets and/or closets. The application divides up massive amounts of information into little compartments by creating and populating the data content into a single table or into a set of allied tables for storage, retrieval and modification. Making use of a cloud-based data storage mechanism as described in U.S. patent application Ser. No. 13/565,171, the data is constantly synched with the replicated copy of a partial or an entire dataset. Various panels/modules of the system are automatically updated in the background with the latest data update from the cloud-distributed database driven by an event callback functionality, which is a feature of the Javascript language. By using this technique, the system architecture does not require computer system threads for syncs and/or multitasking.

Cell & Grid

In an embodiment of the invention, the system may reserve a portion of or all of the available screen area for the rendering of content. This reserved area of the browser for rendering of content includes a Canvas element, a grid of small cells arranged as rows and columns, as small as 1×1 or n×n, limited only by the display form factor of the end device. Each cell is a graphical shape that can be as small as a pixel on the rendering screen or can be the entire screen comprising of all pixels available on the rendering screen. The system regards each cell of the grid or the entire grid as a persistent object of the type, Node, as described in U.S. patent application Ser. No. 61/602,241. This object can contain other objects as a simple collection, a hierarchical object graph, nested objects, or a combination of the three. Graphically represented, these cells/objects are selectable by a mouse click, a keystroke, a touch related movement or any other input device command. These cells/objects can be used to present data from various types of messages, data packets, data streams, local or remote databases, or a combination thereof. These cells could overlap, wherein the underlying cells may or may not be visible or partially visible to the end user interacting with the user framework.

The combination of cells in the form of rows and columns would be similar to the calendar grid provided in U.S. patent application Ser. No. 61/602,241. Each of the cells or the whole grid, or a portion thereof, renders information contained in the database. These cells or the whole grid, or a portion thereof, can be highlighted by a blinking boundary, blinking colors, the differentiation of colors or any other means as a response to data updates or event notifications.

Nodes/Cells/Grid may be consumers and renderers of information and data content. The data cells/nodes access or receive data from a local/remote database or from a data stream. By declaring themselves as event listeners on the screen, the nodes/cells receive user input/action; each cell/node by itself or as a combination have a two-fold purpose: Renderer of the information from the database (local and/or remote in the cloud) for user consumption in the form of visual content, data streams, audio bites or physical/mechanical action or a combination thereof, and, Capturer of the user action for an interactive framework and for processing the corresponding logic that is specific to each and every user request/action.

For navigating the massive amounts of data stored in the cloud or for rendering data from any other content source, the GUI includes a designated area within the confines of a standard Internet Browser or a native rendering surface specific to the rendering device.

Figure 5:
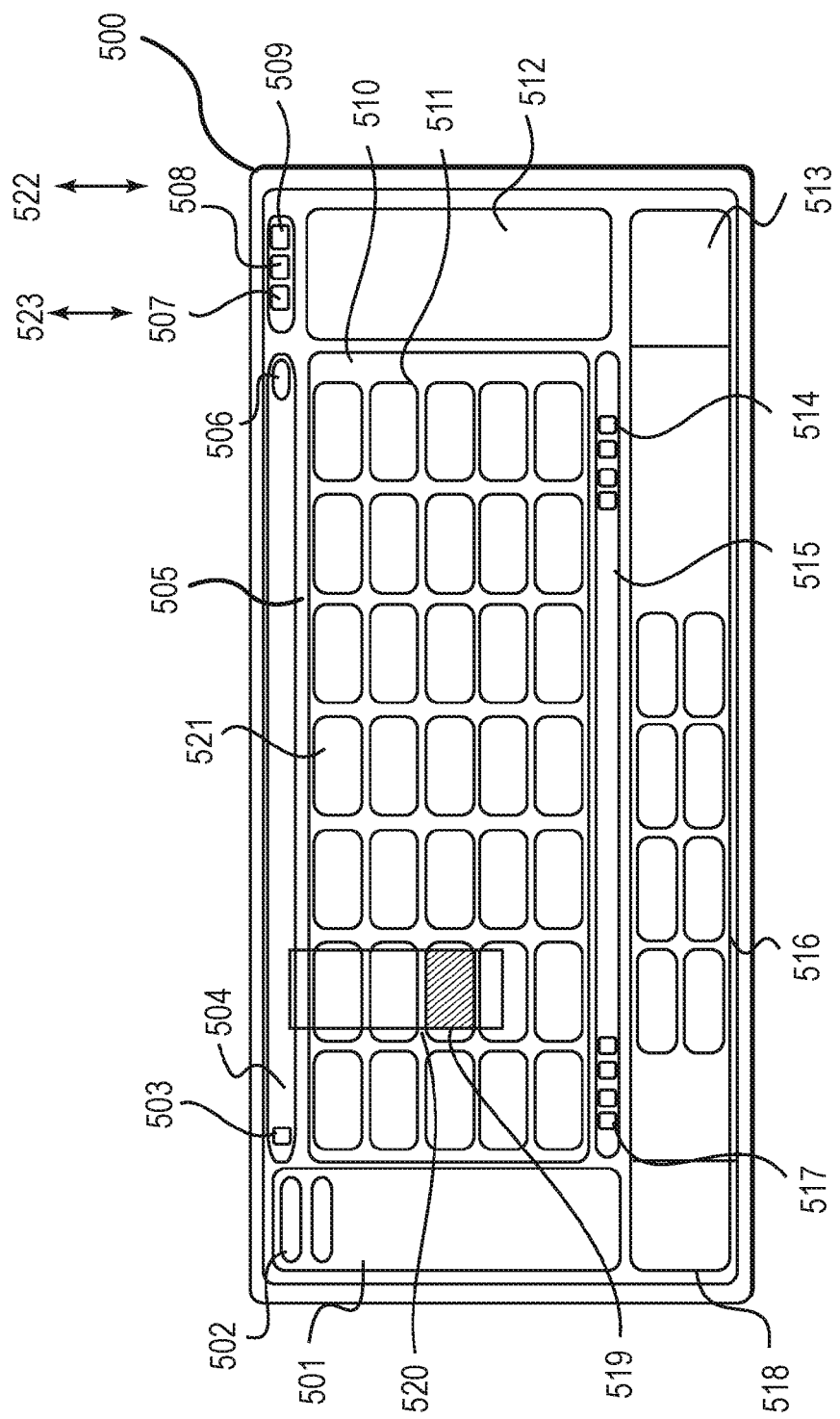
FIG. 5—Calendar Monthly view (Laptop/Desktop form factor).
Figure 6:
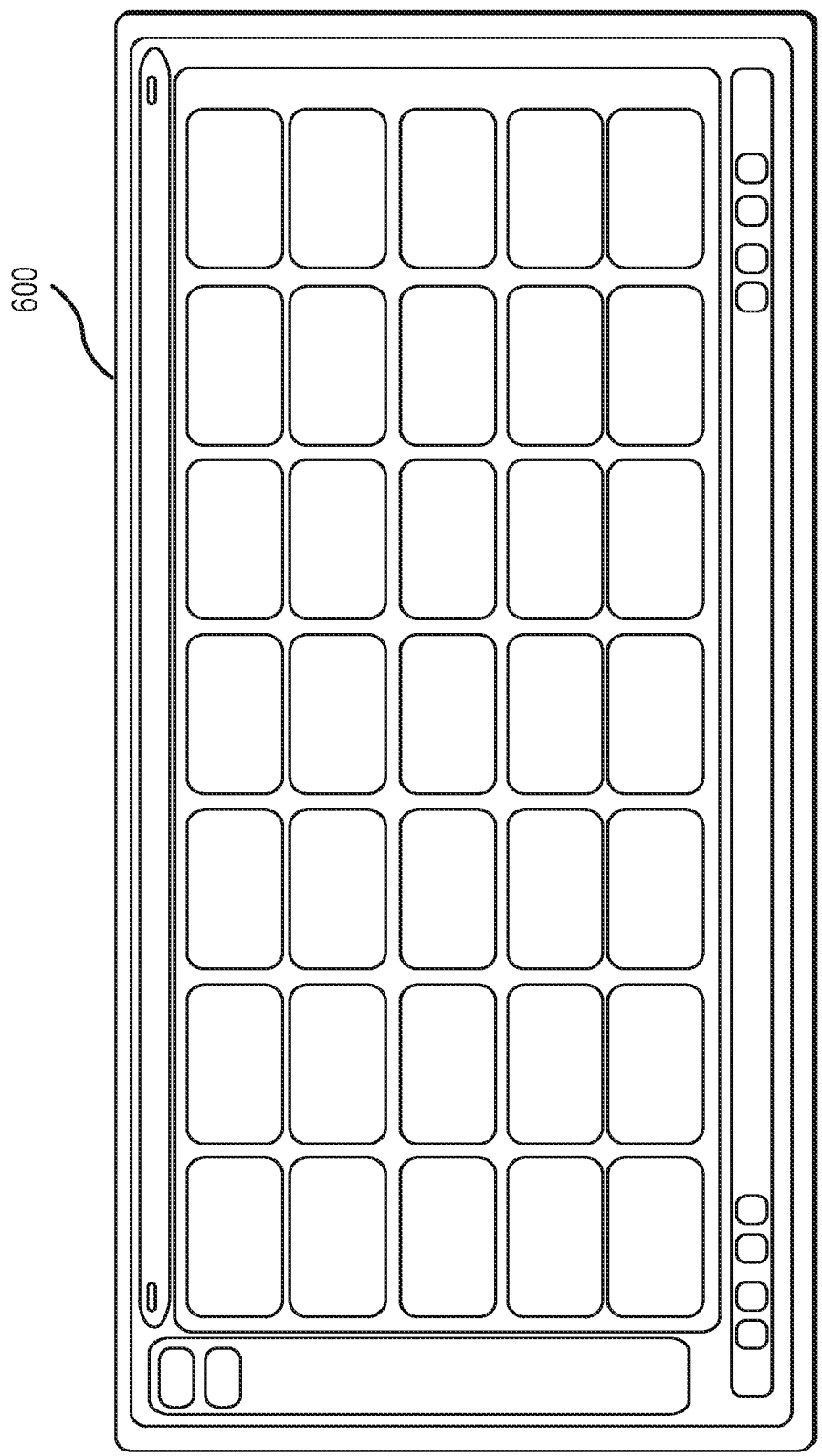
FIG. 6—Calendar Monthly view (Tablet/Phone Mobile form factor—compressed mode).
Figure 7:
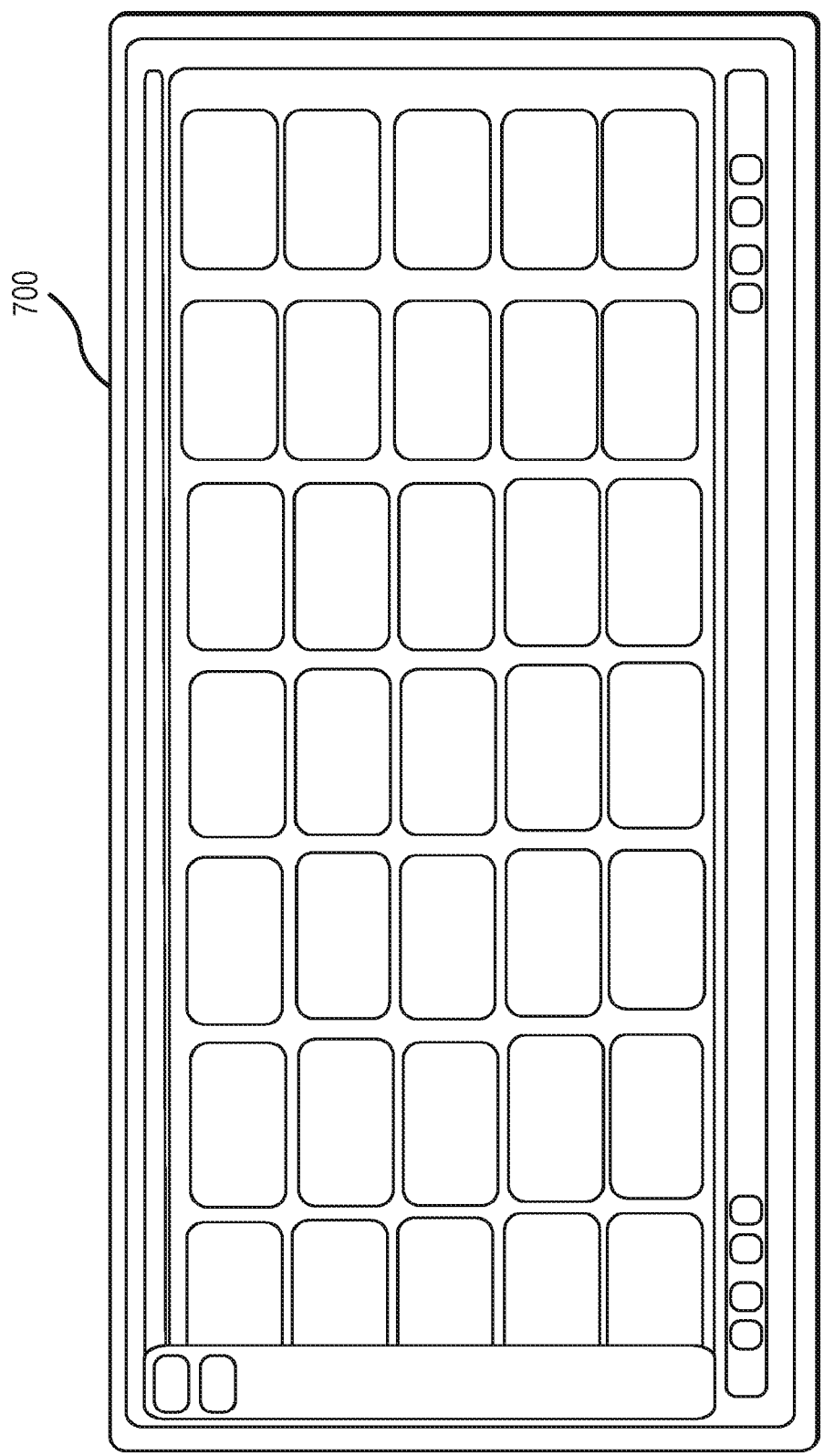
FIG. 7—Calendar Monthly view (Tablet/Phone Mobile form factor—overlapped mode).

In FIG. 5, the application provides a GUI (PCGUI) for traditional personal computers (PCs), laptops, televisions or computing devices with large screens (form factors) or a motion/gesture detection device which is different from the GUI (MOGUI) that is customized/configured for tablets/phones/tablets or other mobile devices, explained in FIGS. 6 and 7. GUI is further customized/configured using some or a combination of various components and their features.

In order to provide the ability for the end user to interact with the system, functionality is divided into various modules. Each module provides a function dedicated to one of the many aspects of the functionality the system provides. To gain access, the user is required to register with the system and create a profile. Once registered, the user can then subscribe to various modules in the system. These modules can address any and all aspects of human life making use of all aspects of computing. For illustration purposes, the description in this document is confined to some parts of a standard Contact Relationship Management (CRM module), a Media Module (Audio, Video, Prints) and a Social Networking Module; however, the system has been designed to allow developers to continue to build new modules encompassing all industries.

The system is a GUI interface that allows interaction with any module's content source, be it a local/remote database or a stream from a remote server. The GUI displays this information in its original or in a modified form depending on the interaction with this information through graphical shapes, audio input or any other digital input.

The system also has the ability to render itself in various layout formats. These can be predetermined or created on the fly. Layouts are designed to maximize the rendering space in the most efficient way—see FIG. 5 for a PC display and FIGS. 6 and 7 for a tablet interface.

Figure 1:
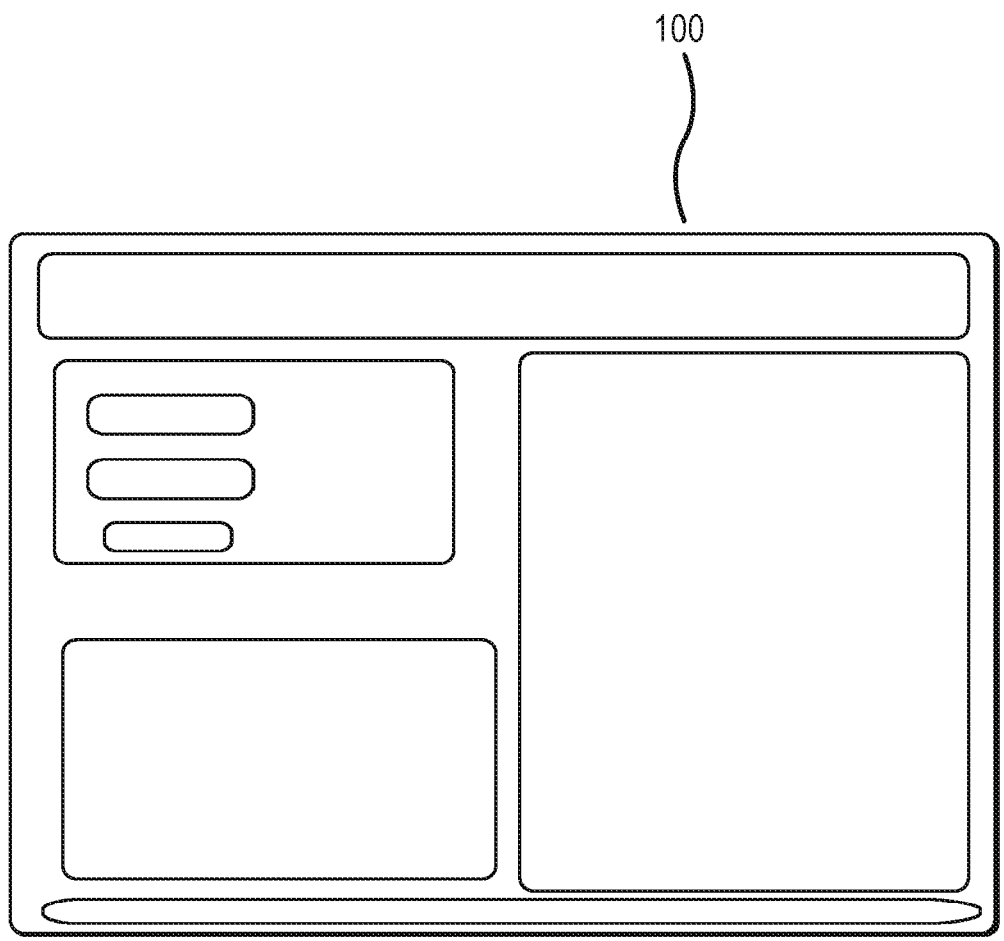
FIG. 1—Login Page.

FIG. 1 depicts the login screen (100) of the system.

Figure 2:
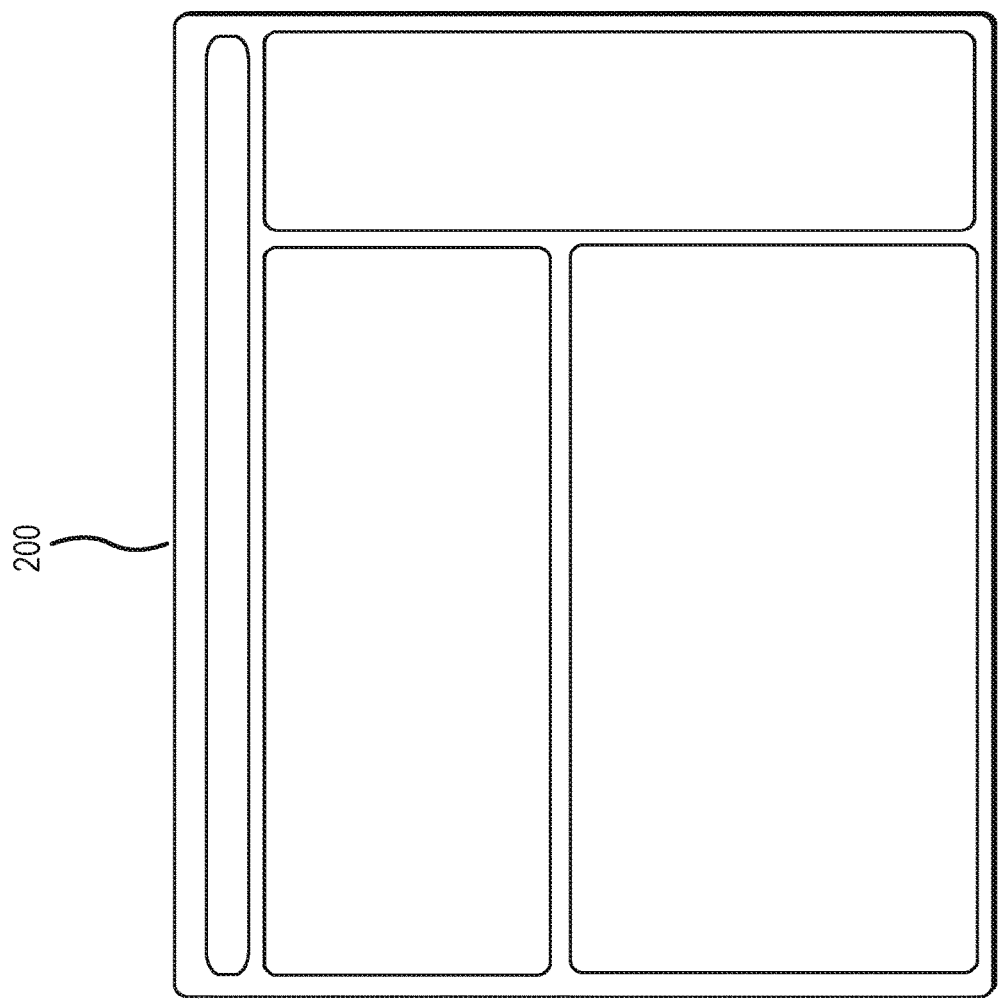
FIG. 2—Profile Page.

FIG. 2 depicts the profile page (200) that is presented to an end user upon successful login.

Figure 3:
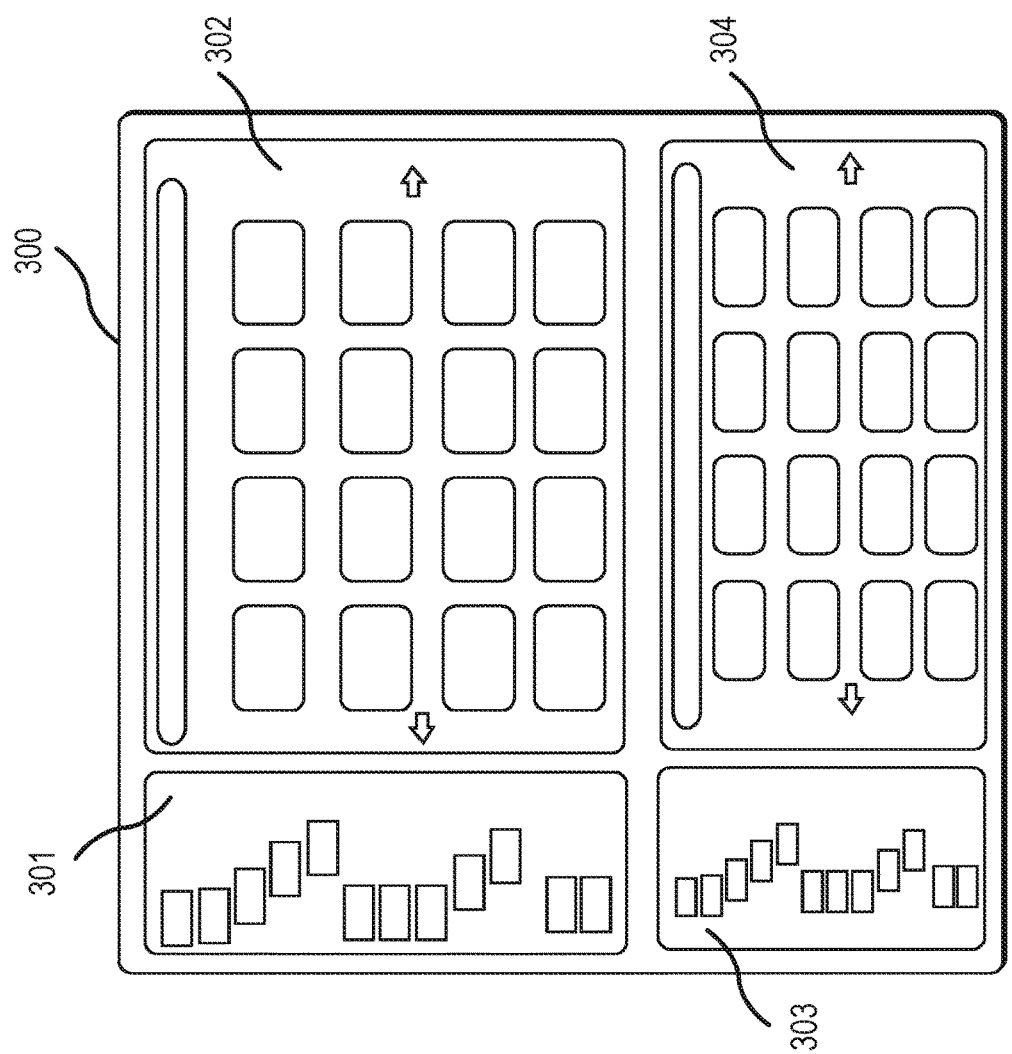
FIG. 3—Mod Pit/Module Store and User Module Repository.

FIG. 3 depicts the module ("Mod") pit panel with the content area (300) divided into 4 main areas/panels. (301) depicts a hierarchical folder/directory structure wherein publishers list all of the Mods available in the system. The folder/directory structure allows for easy search and/or navigation of the available modules by, amongst criteria such as, publisher, creator, date of creation, popularity or category. Clicking a mouse, gesturing through a motion detection device or tapping on a touch-sensitive mobile device allows the user to select and drill deeper into lower levels of the folder/directory hierarchy. Mod pit (302) lists all of the modules available for subscription in the selected directory.

Mod home (304) lists all of the modules subscribed to by a user. Buying a subscription to a module or selecting one to use is as simple as dragging a desired module from the Mod pit (302) and dropping it onto Mod home (304). (303) lists the directory/folder structure of the modules selected/subscribed to by the user. The system automatically imports related hierarchical structure from the Mod pit (302). Folder/Directory hierarchy listed in (301) and (303) is non-editable and is always in sync for all of the user subscribed Mods.

Figure 4:
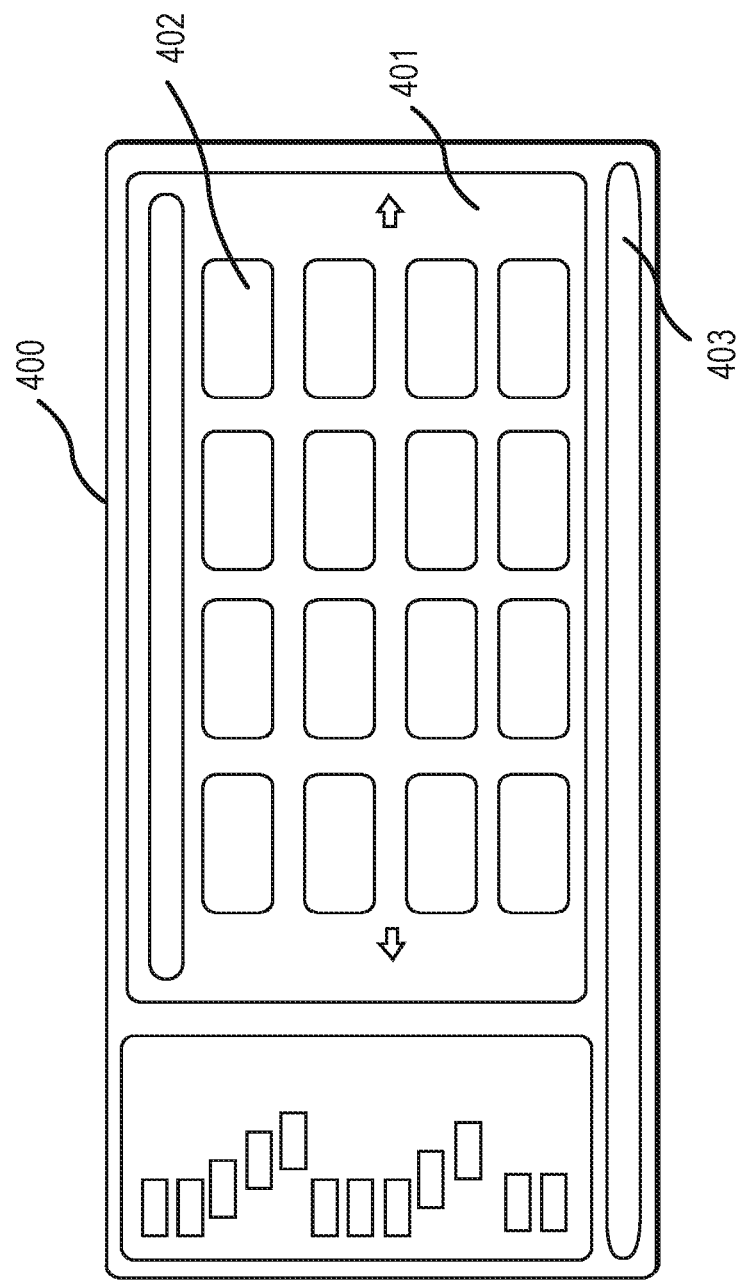
FIG. 4—User Module Profile.
Figure 8:
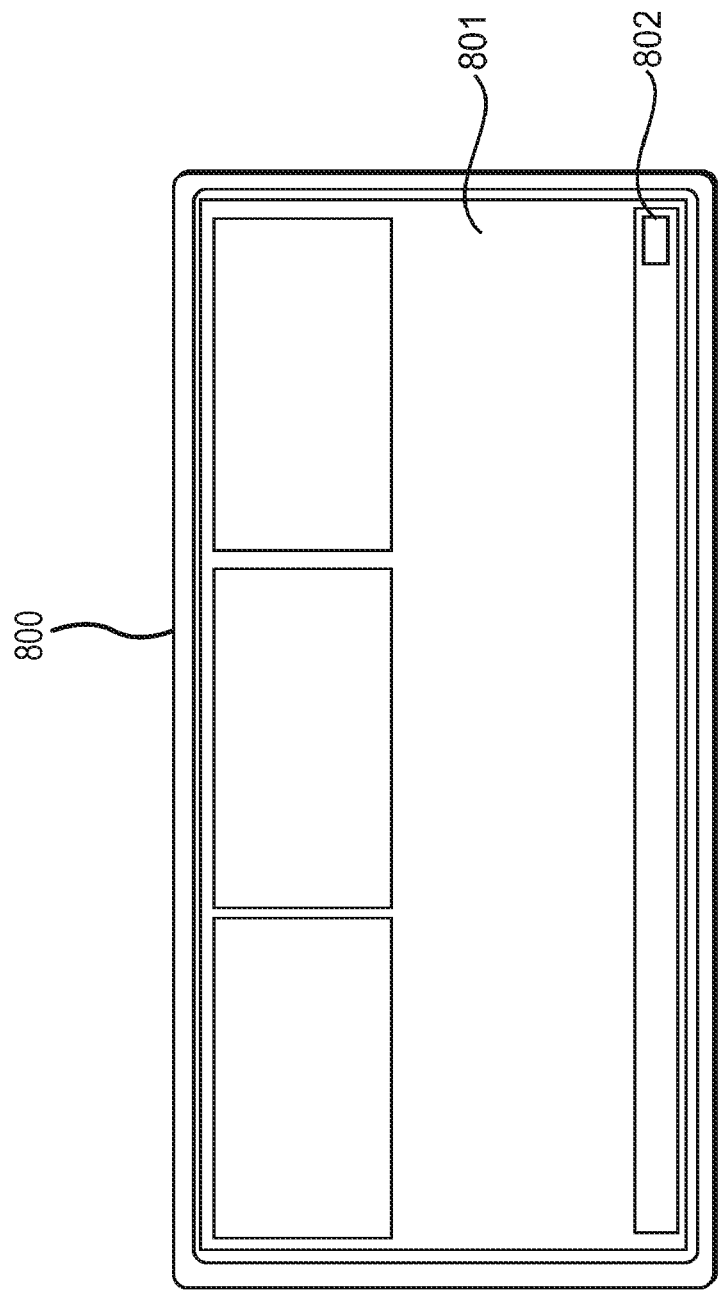
FIG. 8—Generic grid for an App X.
Figure 9:
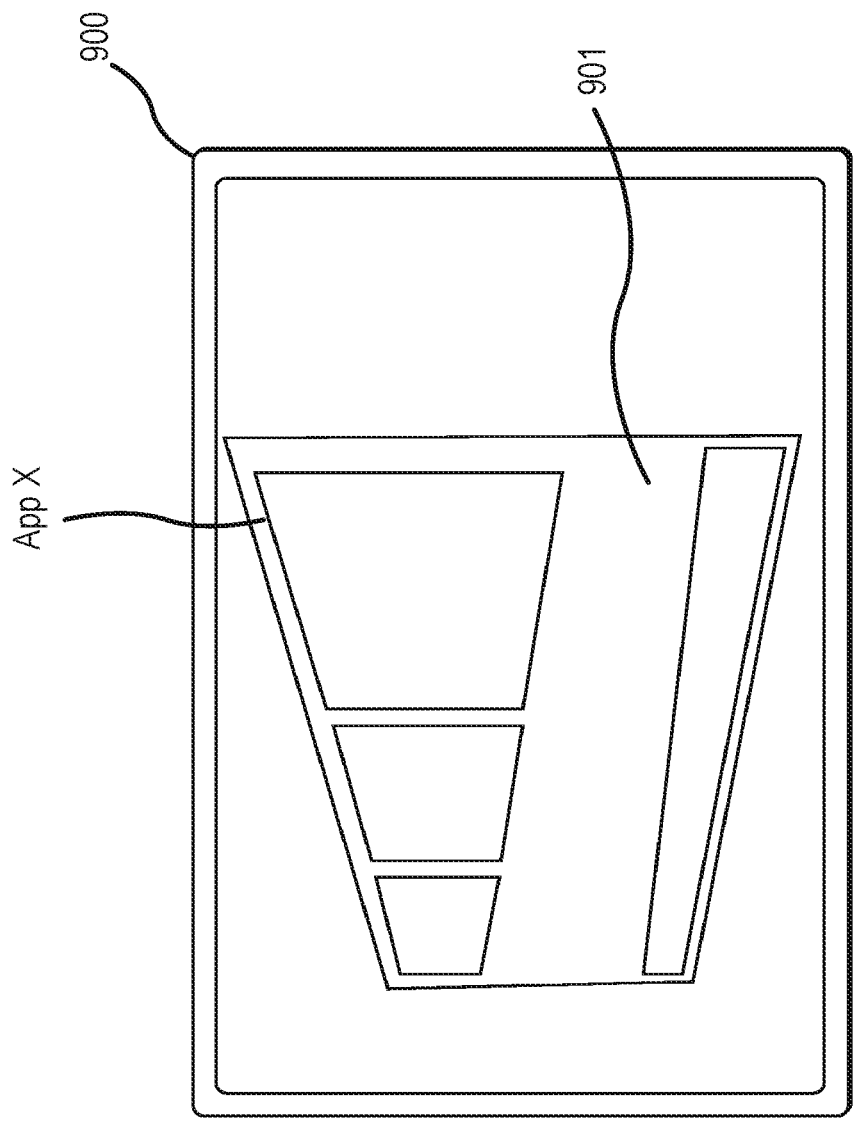
FIG. 9—Generic grid for an App X rotating.
Figure 10:
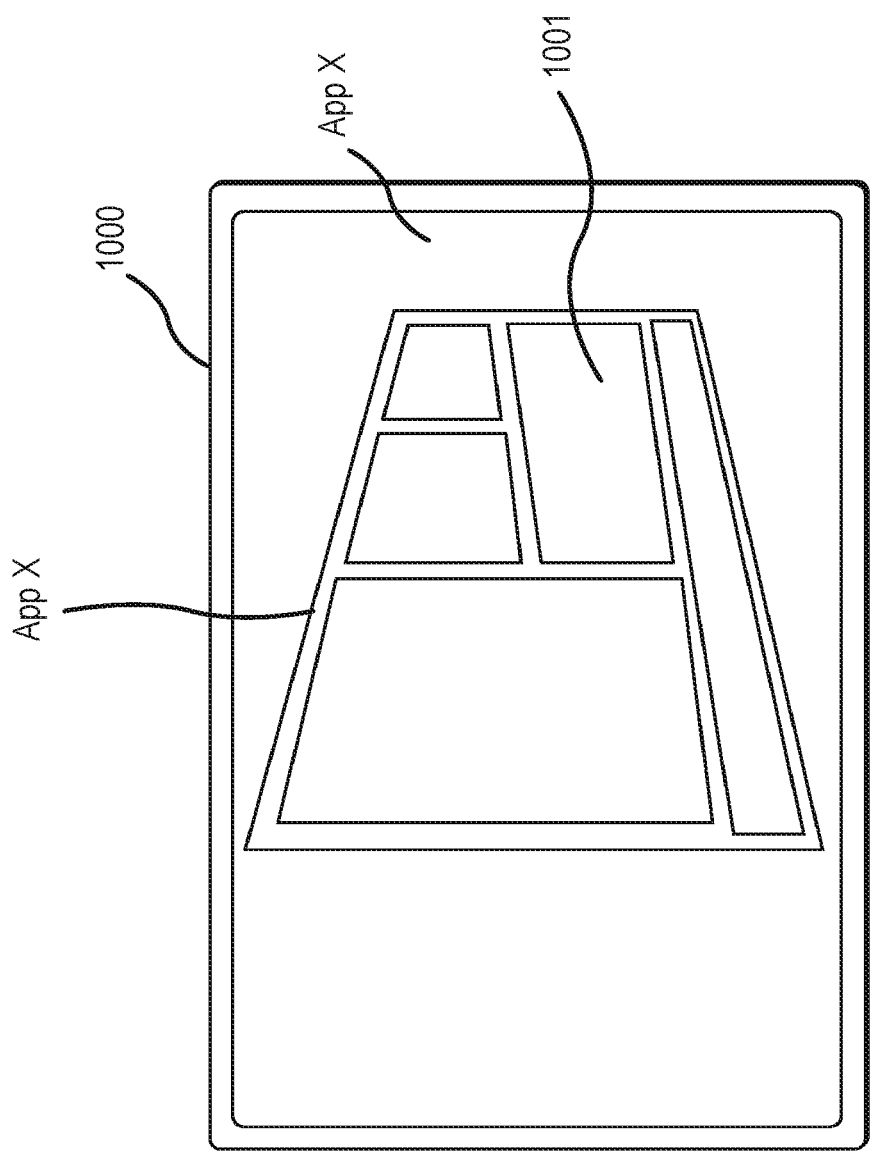
FIG. 10—Generic grid for an App X in the background and generic grid for App Y in the foreground.

FIG. 4 depicts Mod home (400). This panel rotates in from the left edge in a counter clockwise fashion and lays itself on top of the main content area (510) described in FIG. 5. The content for (401) in FIG. 4 is a listing of all of the user-subscribed Mods as explained in FIG. 3. There is a close button (403) on the Mod panel; clicking on the close button (403) or selecting one of the Mods (402) from the Mod panel causes the panel to rotate left in a clockwise fashion and thereafter disappears from the view. Selecting a Mod (402) is as simple as clicking a mouse button on one of the subscribed Mods on a PC or tapping on a Mod on a touch sensitive device. In a nutshell, the Mod home (400) is used for switching from one Mod (402) to another ("Inter-Mod switching"). FIGS. 8 through 10 depict Intra-Mod switching by rotation of (801), (901) or (1001). As the system rotates these panels, the background panels are automatically updated with the latest data from the database in the background; thus, when the new panel is rotated in for the requested module, it rotates into the foreground with the latest dataset. In the process of switching modules and/or while calling certain functions, a sound byte may be played via/on the client machine.

FIG. 5 is a block diagram illustrating an example system for providing a GUI to a user. The GUI provides a unique and universal interface for the end user to navigate within the selected Mod of the application. FIG. 5 illustrates an example of (500) calendar Mod for providing a GUI to a user to navigate and interact with the monthly interface of the calendar Mod.

Components (501) through (520) describe the look and feel part of the application framework. Although the components in their outer or shell form remain the same as the user navigates various application Mods within the system, the internal contents, HTML URL links, or actions change based on the loaded Mod.

The layout has a traditional webpage navigation bar (501) in the upper left corner. Inside the navigation bar (501) are the navigational links (502) that connect various features of the Mod that are in the foreground. At the top is a title bar (504) that has two controls for navigation to the Mod (503) and to navigate to Profile home (506). The Mod panel or main panel (505) contains client-subscribed Mods described in FIG. 4. On clicking or tapping (503), the Mod panel or main panel (505) rotates in from the left edge in a counter-clockwise motion and sets itself on top of the whole content area (510). (510) is the main area wherein content gets displayed; in this case, it is the monthly, daily, weekly and yearly view of the calendar functionality of the CRM module.

The upper right panel has three more controls: (507) syncs the client data with the server (523) on demand, (508) refreshes the link for content from the local database (522) on demand, and (509) is a link to the update center. (510) is the main content panel, which displays the main content of the Mod. Using a calendar example, grid cell component (511) resides in the main content area (510). (512) is the commercial panel for display ads or themed commercials. (513) is a social networking Mod update panel.

(515) is the bottom menu panel. (515) is dynamic in nature and loads Mod specific appropriate controls (514) on the right part of the menu bar based upon the selection of the application Mod. As the user switches Mods dynamically, the controls (514) in the menu bar correspondingly change. The controls on the left side of the menu bar (517) are controls specific to interacting with the functionality within a Mod. Using these controls, a user interacts with the functionality specific to a Mod.

An example in the CRM module, (514) would be either EMail, Contacts, Calendar, Chat, Telephone Dialer, etc. As the user switches or selects a different Mod like social networking, (514) would change to, Boards, Messages, Collages, Media Lib, Games, etc. Inside the CRM modules, the application (517) would be control specific to the functionality selected within the CRM Mod, such as Email; so the controls (517) would be something to the effect of Compose an EMail, Reply, Forward, etc. The navigational components (501) behave exactly the same way in step with the bottom menu bar (515) as the user navigates from one Mod to another.

(516) would list the grid functionality specific to interacting with the content in (510). As explained in FIG. 6, in mobile devices, (516) is hidden underneath (510) and slides in from the bottom upon request.

In a calendar subscription mode, (516) would provide a grid of the calendars that the user has subscriptions. Each one of these calendars contains one or more events. The user is able to subscribe to these calendars as explained in FIG. 3. Selecting one or more of these calendars from the grid would allow the user to view events in a superimposed/overlayed/combined fashion with the events from the personal calendar.

Overlaying/combining multiple events from multiple calendars or a single calendar could lead to importing/scheduling of conflicting events. Resolving these conflicting events is handled through a conflict resolution panel as explained in FIG. 13.

As the number of calendars that the user subscribes to increases beyond a certain point, navigating or manipulating through the clutter of multiple calendars can become extremely difficult. To organize the calendar collection or for that matter any collection of files, the system provides a hierarchal folder structure on the left in a separate file system panel (518).

In addition to normal scrolling within the Mod panel or main panel (505) as explained in FIG. 3, the system provides scrolling functionality within every grid cell (521) of the grid cell component (511). The scrolling within a grid cell component (511) is achieved by utilizing grid cell component (511) and scrolling panel (520). The scrolling panel (520) is of the same size as the size of the grid cell component (511). If the size of the graphic(s) on the scrolling panel is bigger than the size of the grid cell component (511), then the system automatically allows the scrolling panel (520) to increase to any size to accommodate the graphic(s) on the scrolling panel (520). The grid cell component (511) clips all of the area of the scrolling panel (520) outside of the grid cell component area. In other words, only the area of the scrolling panel is visible within the grid cell component (511) as shown by the shaded area (519).

The leftmost button (530) on the bottom panel is one of the two pieces relating to the zoom functionality provided by the application. The other piece of the equation is either the mouse pointer, a stylus or a finger touch on a touch sensitive screen. (530) button behaves like a Boolean variable with two values, 1 (zoom in) or 0 (zoom out). The Boolean value set by button (530) inside the application allows the application to zoom in (expand) or zoom out (contract) of any graphic on the canvas. If desired, the application can disable this variable. An example would be turning off the functionality during certain operations such as drag and drop. This functionality can be further enhanced by correlating the amount of time the user presses the stylus or puts a finger on the desired control to the rate of zoom in and zoom out; the rate can be accelerated exponentially as the user continues to hold down the button.

In another mode, the button (530) is either not preset or is not used. In this scenario, the end user either double clicks or double taps with the first finger and then either taps (or mouse clicks) for zoom in or double taps (or double clicks) with the other finger to zoom out.

FIGS. 6 and 7 are block diagrams illustrating an example of a calendar Mod (600)-compressed mode and a calendar Mod (700)-overlapped mode, respectively, for providing a GUI for a user on a mobile device (MOGUI), e.g., tablet/phone. This GUI is the exact same interface as (500) explained in FIG. 5, but without the navigation bar on the left. The GUI enables a user to interact with the calendar by creating/modifying/adding/viewing events, tasks, meetings or calendars and by subscribing to events, calendars, amongst other things. Calendar modules (600) and (700) represent monthly activity of the system user with various viewing options.

FIGS. 8-10 depict generic panels displaying content in the main panel (800), (900) and (1000), respectively. One or more content sources (communicates with the GUI through a wired or wireless connection). The content source can be a local database, a remote server database located in the cloud, a remote stream, a remote web page, a remote script or something else. Local content can include a user's personal calendar data, as well as, remote data for collaborative events already imported into the local storage. The system also has the ability to connect with remote data servers with proprietary or third-party calendars for remote purposes. As the user navigates the vast amount of information that is available to the user from private databases and the public cloud, the system compartmentalizes the content into various categories. The data's functionality is then compartmentalized into various Mods, such as CRM, Social Networking, etc. The CRM Mod consists of various sub Mods such as, EMail, Contacts, Calendar, etc. As the user moves/switches from one Mod to another using control (802), the system rotates out the whole content panel (800), (900) or (1000) by 180 degrees and rotates in the new content panel by 180 degrees as depicted in the sequences of FIGS. 8 through 10. In essence, on switching Mods by control (802), the system switches the content panel from (801) to (1001). By doing this, the system has switched the user interface Mod from Email to Calendar or to some other Mod. The rotating functionality is common in both the PC interface as depicted in FIG. 5 and on a mobile device interface as depicted in FIG. 6 and FIG. 7. A horizontal or vertical rotation of the panels may be achieved with the same functionality corresponding to the appropriate look and feel of the interface.

Figure 11:
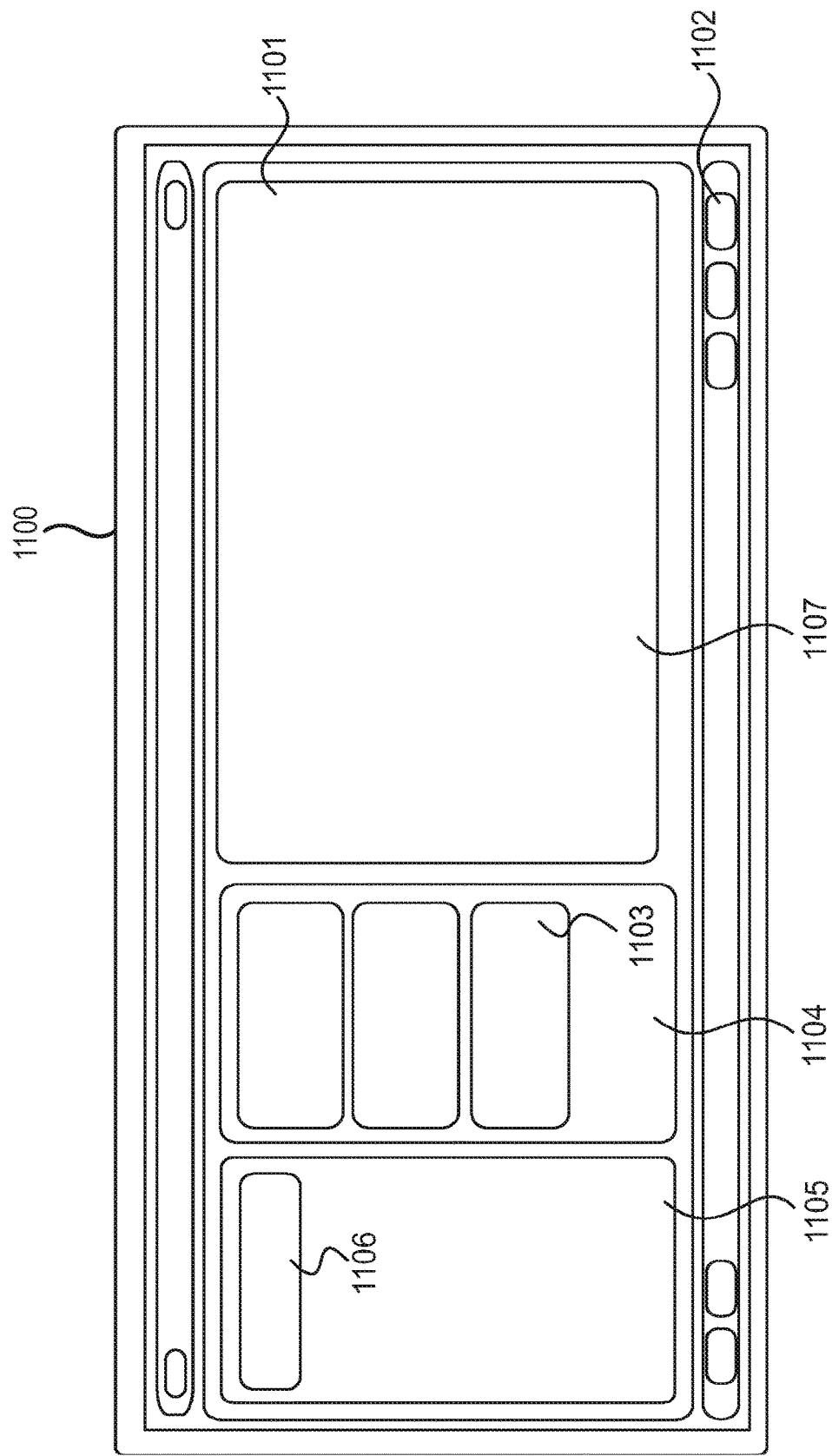
FIG. 11—Hierarchical Detail Interface that can be used for any file/directory structure.

FIG. 11 shows another configuration of GUI (1100) illustrating the use of a hierarchical tree structure in the left panel (1105), similar to that of (301) in FIG. 3. (1104), to the right of (1105), provides details of the contents of the graphical shape (1106) (which happens to be a folder/directory structure in this case) selected in the left panel. (1107) of the main content panel (1101), to the right of (1104), provides further details of the graphical shape (1103) selected in (1104). This daisy chain could continue without limitation. The system dynamically provides the Mod functionality to the left as the user moves down the hierarchy.

Figure 12:
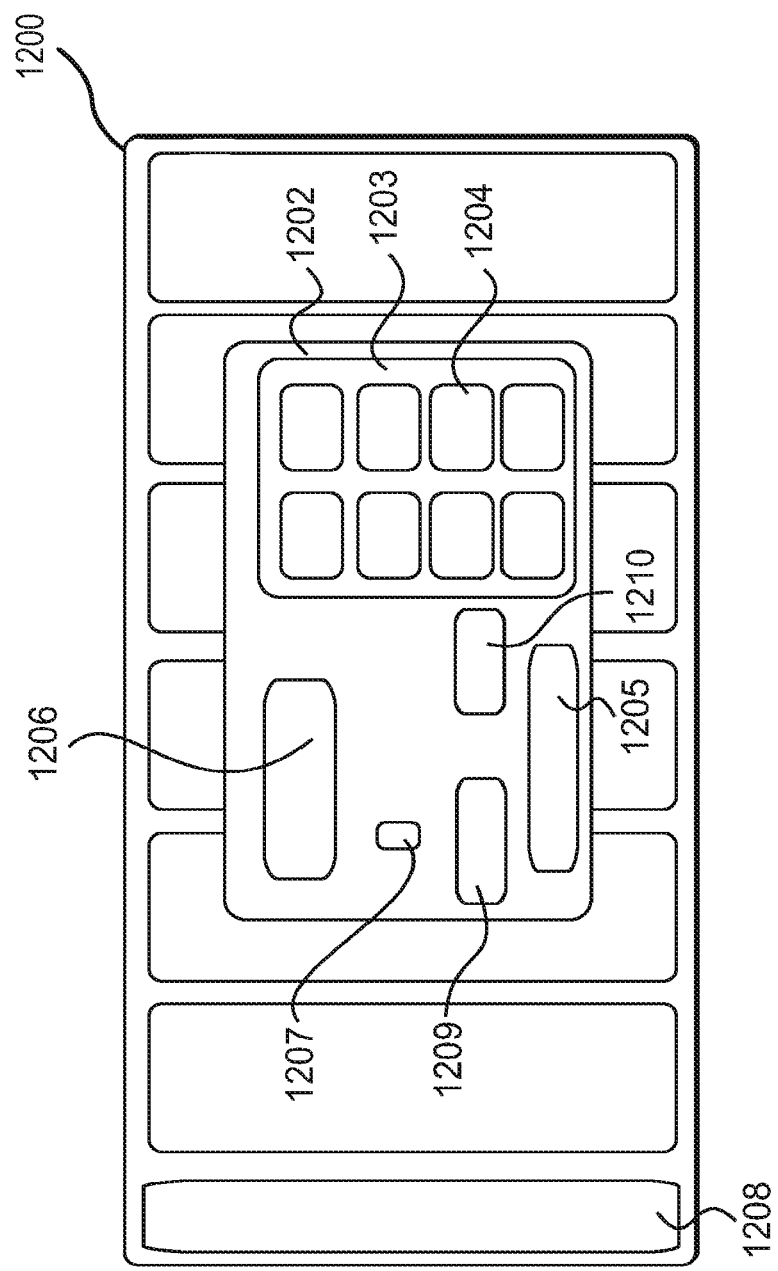
FIG. 12—Day Schedule Event Repository.

FIG. 12 illustrates the day scheduling panel (1200), it contains a day panel (1201) for each day of the day schedule. (1202) is an event panel that provides users with a list of events that they can drag onto a desired day panel (1201); If the number of events exceeds 8 panels, then the system provides the user with a hierarchical directory/folder structure similar to the one in FIG. 5 to for easy navigation and for the selection of events from a large repository of day schedule events. A user can create multiple day schedules with a unique name in (1206). (1207) provides the user with the ability to skip holidays and events, while (1206) schedules the event with a start time (1209) and an end time (1210).

Figure 13:
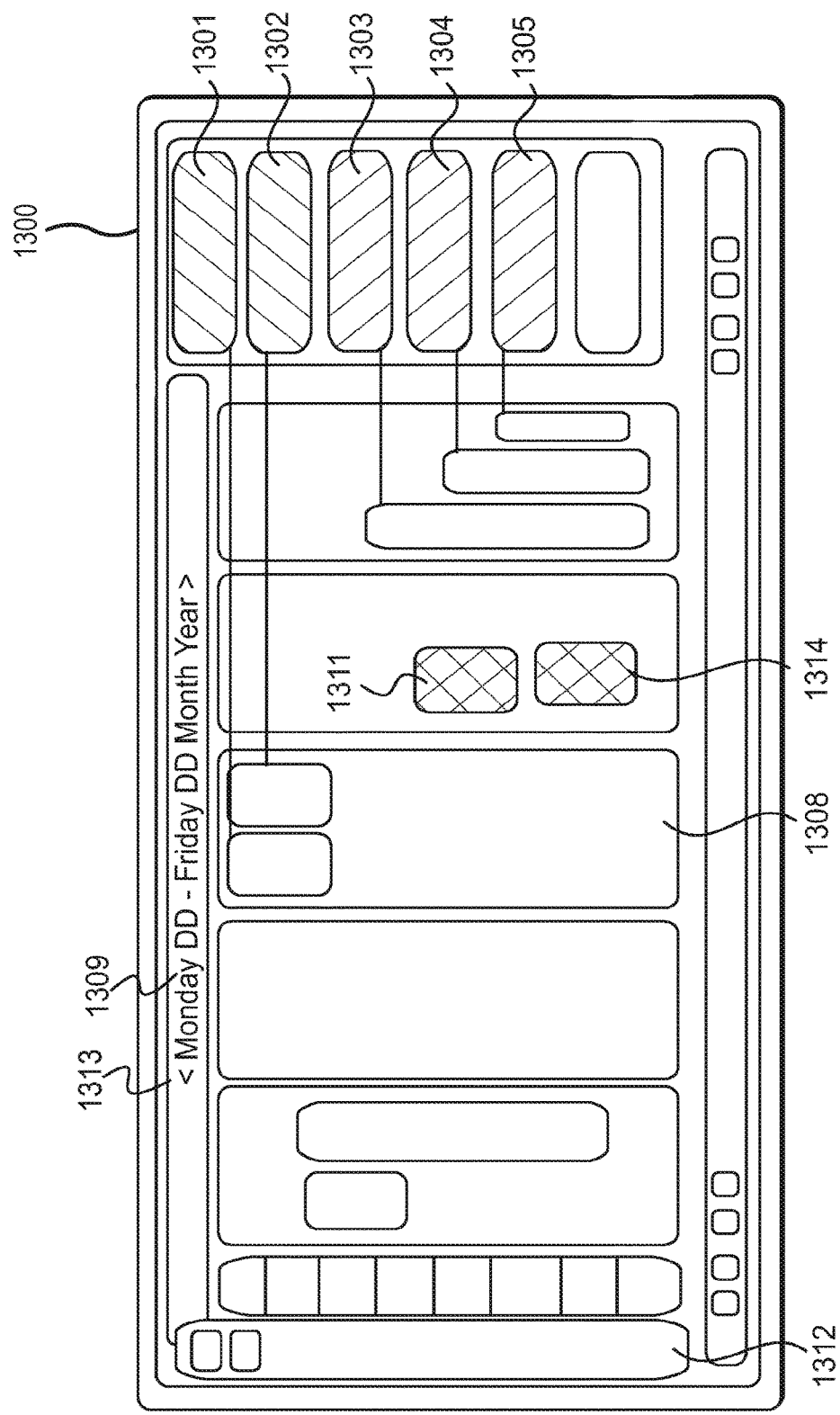
FIG. 13—Conflict Resolution Panel.

FIG. 13 illustrates a conflict resolution panel (1300), which is used to resolve conflicting events/meetings/tasks either fully ((1301) and (1302)) or partially overlapping one another ((1303), (1304) and (1305)) in the same time slot—these refer to the events that overlap each other in terms of time span. Using the conflict resolution panel (1300), the system provides a user with suggested open/empty event slot(s) ((1311) and (1314)) to reschedule the event and remove the conflict. There are five panels (1308) representing five days of the week, and a panel (1312), which provides an hourly piece in a given day. (1300) is scrollable in its entirety on an hourly scale. The number of (1308)

panels on (1300) can be extended to 7 to accommodate all the days of the week. Other controls, such as those described in FIG. 5, may be included. (1309) provides a weekly date for user reference, while (1313) provides arrows to move backwards by a week—there is a similar arrow on the other side for forward movement. The ability of the system to leverage the computing power of the cloud in this setting and being able to prompt the user with empty slots to reschedule meetings/events/tasks is unique.

Figure 14:
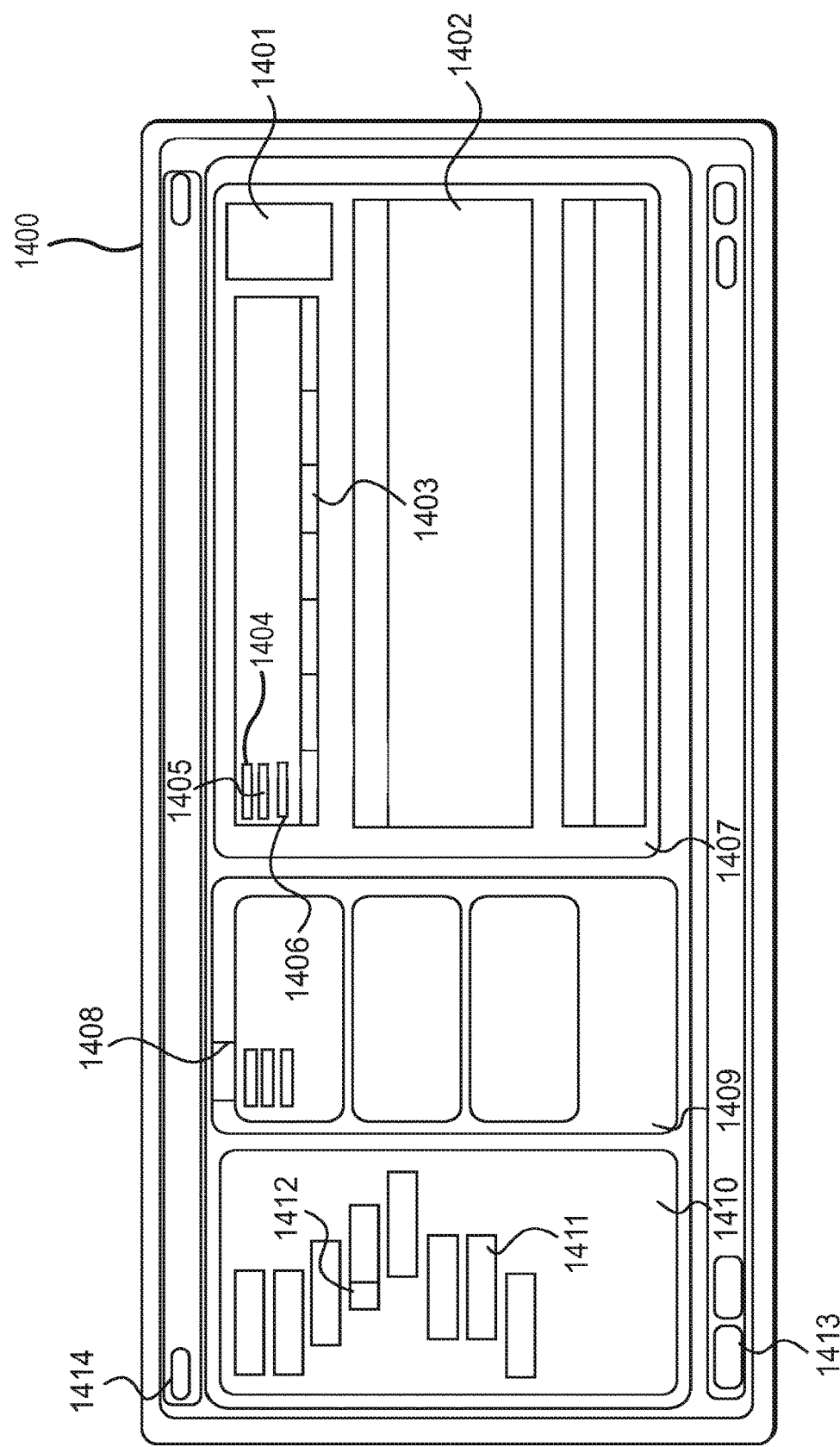
FIG. 14—EMail View.

FIG. 14 illustrates an email interface panel (1400), using graphical elements drawn on a canvas. (1401) is a grid cell component as explained in FIG. 5 with a scrolling panel. An email message is divided into smaller panels (1402) with each piece depicting every exchange between the sender and the recipient. Control (1403) is a horizontal scroll bar with blocks. The blocks start at number 1 and correspond with each exchange between the sender and the recipient. Clicking on (1403) brings the appropriate exchange state panel (1402). (1404) through (1406) provide various standard fields associated with an email exchange; there may be more than three fields—three fields are used here for illustration purposes only. (1407) is a container panel for all panels, (1401) through (1406). (1408) is a sorting field control for listings in (1408). (1409) contains all of the contents of selection (1411) in (1410). The leftmost panel (1410) provides hierarchical file/folder structure for navigating emails similar to the calendar hierarchical folder/directory structure described in FIG. 5. (1412) provides collapse/expand control for the folder/directory structure. (1413) provides email specific feature control. (1414) provides a link for switching modules. (1402) is a Canvas based panel and, thus, has the ability to render the whole calendar grid as explained in FIG. 5, thereby allowing for an embedded interactive calendar inside of an email message.

Figure 15:
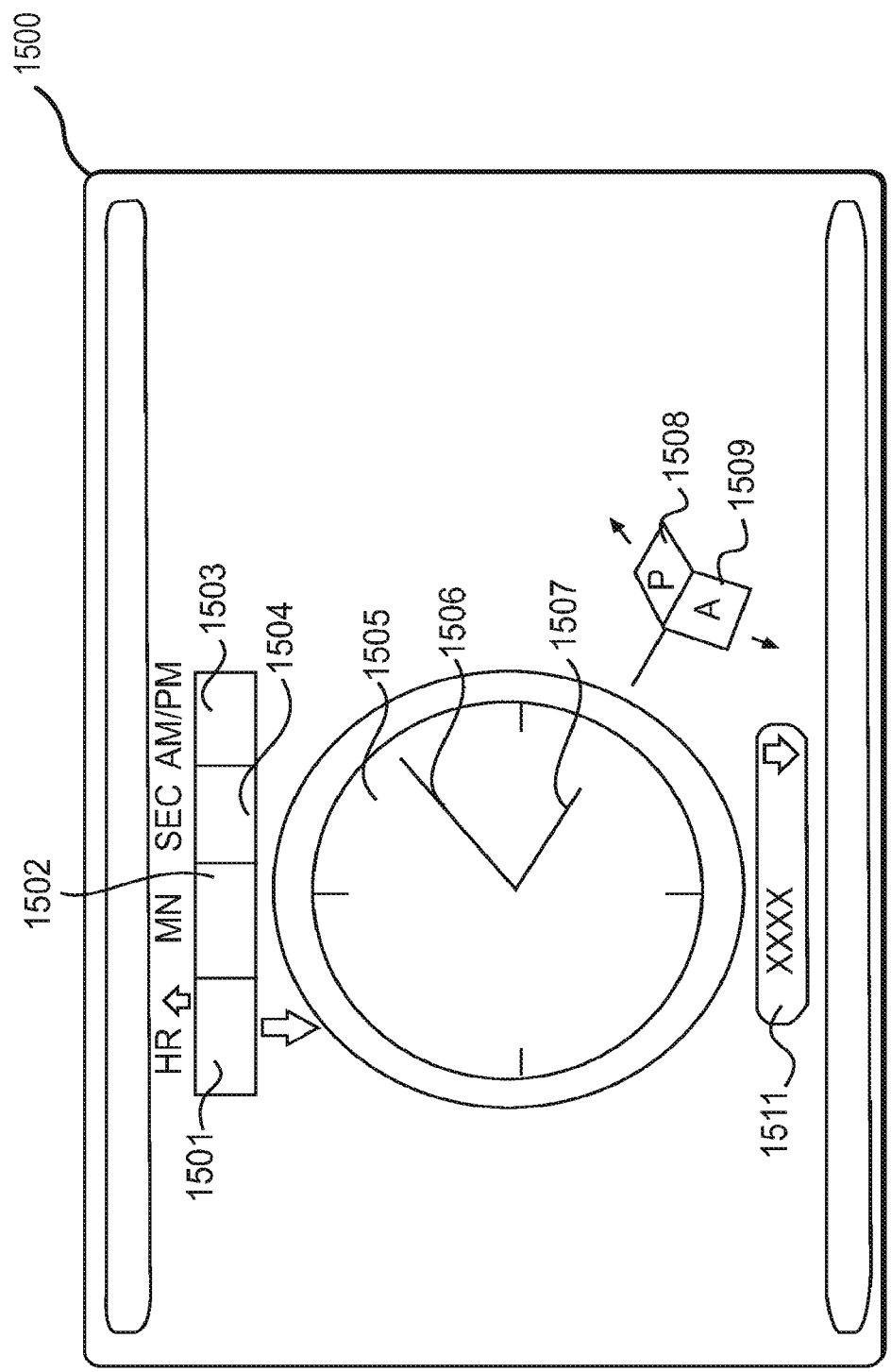
FIG. 15—Alarm Clock Panel.

FIG. 15 illustrates the system's ability to set an alarm on the main panel (1500), as a notification event in the user's calendar profile as illustrated in FIG. 5. (1501) depicts the hour component of the alarm time, (1502) represents the minute component, (1503) is the second component and (1504) refers to the AM/PM component. (1505) is the analog dialog of the alarm clock representation, (1506) is the minute hand and (1507) is the hour hand. Using (1508) and (1509), the user can set a new alarm or change the time of a previously set alarm. Every alarm set in the system has a unique name and is displayed in (1511). A user can select any previously set alarm by using the dropdown control (1511).

Figure 16:
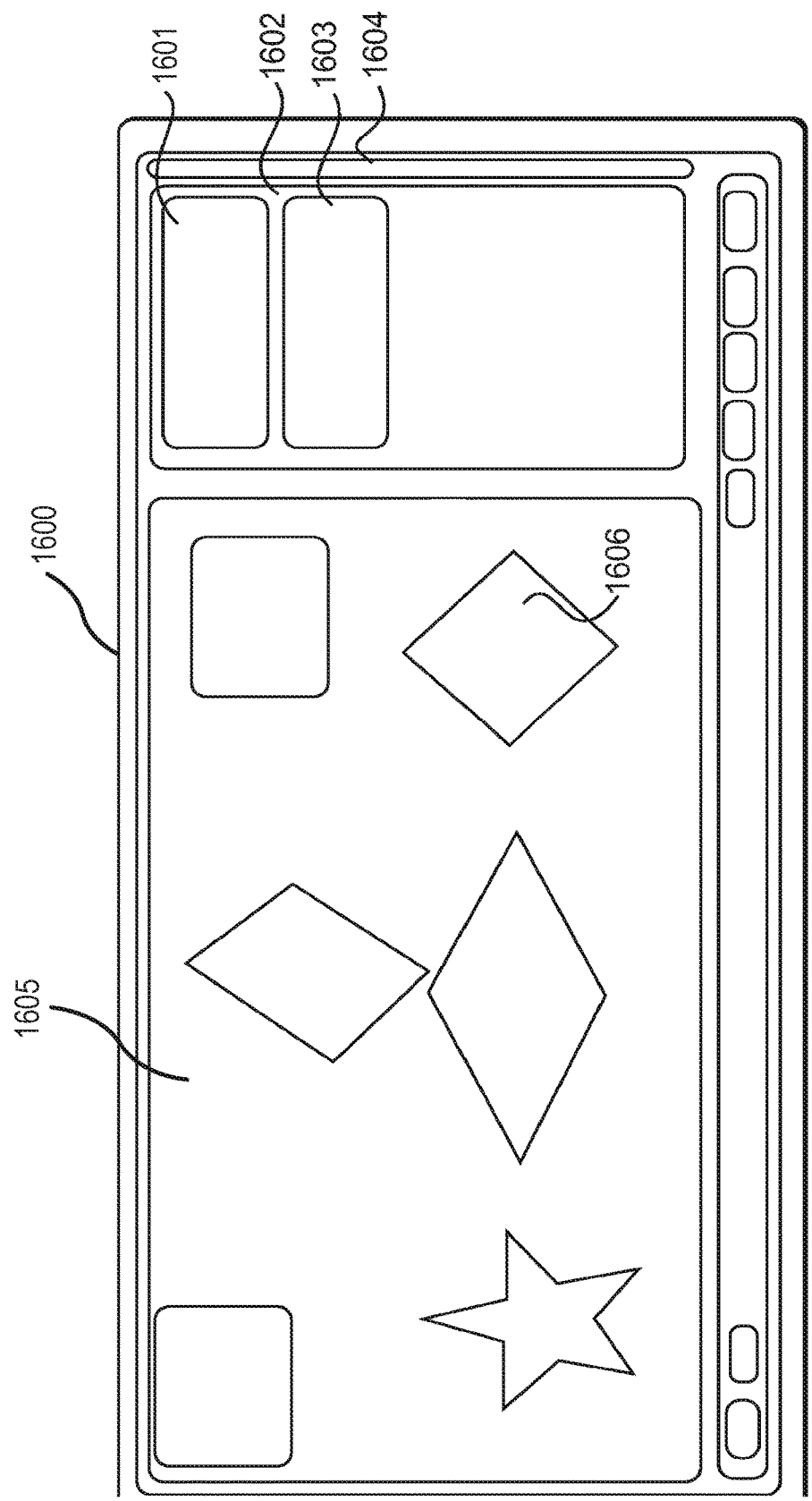
FIG. 16—Collage/Board view with graphic image/picture/audio/video as a background; multiple graphic/picture/audio/video layered/superimposed on top of the background in the left panel; the right panel contains comments for the entire Collage/Board.

FIG. 16 illustrates the cloud enabled social media collage (1600). On the left is the collage panel (1605) with a background image represented by a graphical shape on a canvas. On the right is a comment panel (1602) wherein the system presents other users the ability to comment on the published collage (1603). The comment panel (1602) contains comments and is scrollable using scroll bar (1604). The system provides the creator/publisher of the collage to directly respond to any and all comments (1601) and (1603). A user creates a collage by overlaying various media components (1606) on the background or collage panel (1605). The media can be of any type—images, pictures, audio, video, etc.

Figure 17:
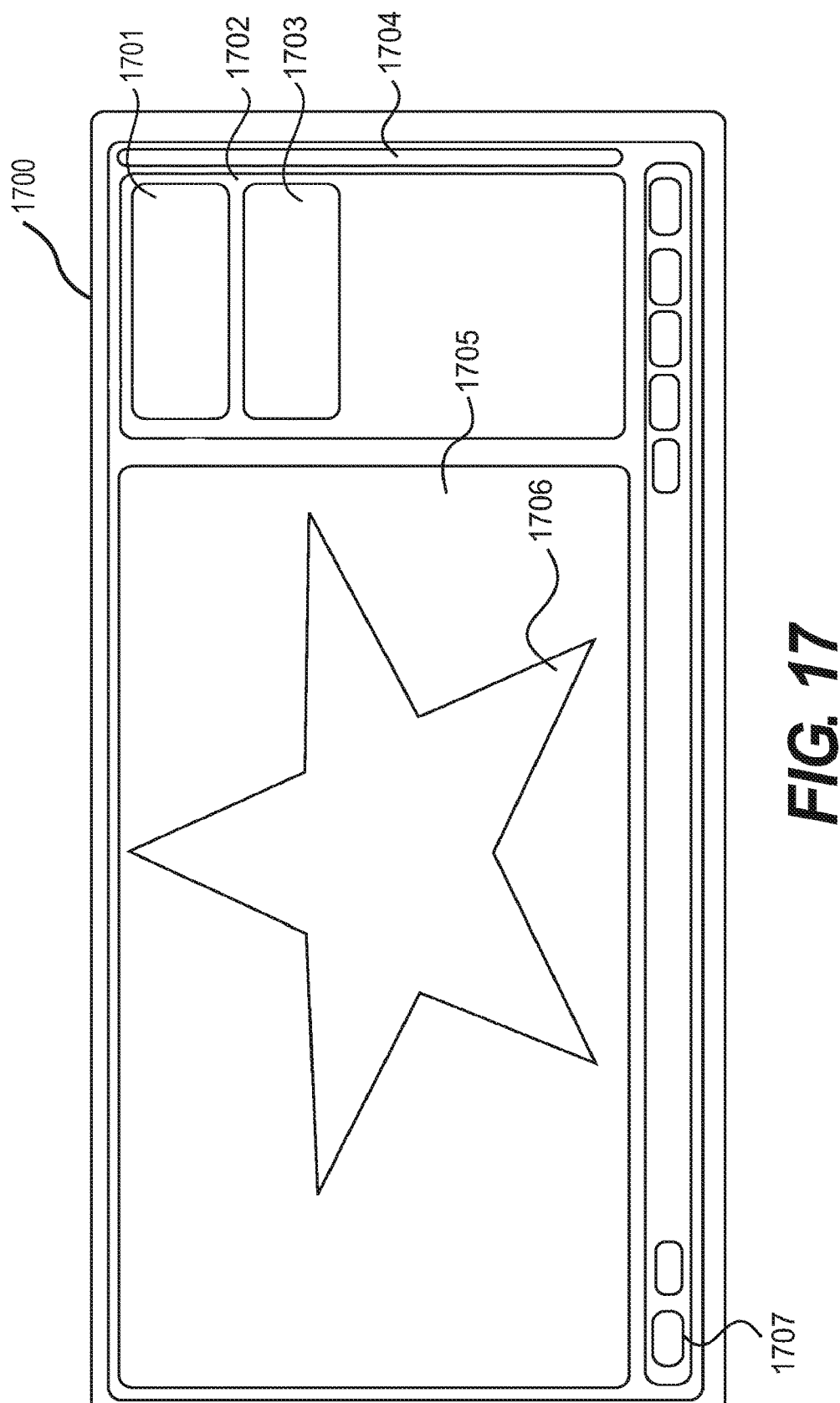
FIG. 17—Expanded view of one of the layered/superimposed graphic/picture/audio/video in the left panel; the right panel contains comments for the selected graphic/picture/audio/video.

FIG. 17 illustrates the ability of users to comment on every single element of a collage individually (1700). The functionality to comment on the complete collage is illustrated in FIG. 16. Every figure on the collage is classified as an event listener, and the viewer of the collage can click or tap on any one of the media elements and then comment on it using (1701). Comment Panel (1702) contains comments from users (1703); (1702) is a scrollable panel with a scroll bar (1704). The media (1706) to be commented on by other users or to be edited by the creator of the collage resides on a background panel (1705). Control (1707) is media specific editing control, such as for adding various effects for graphic images.

Figure 18:
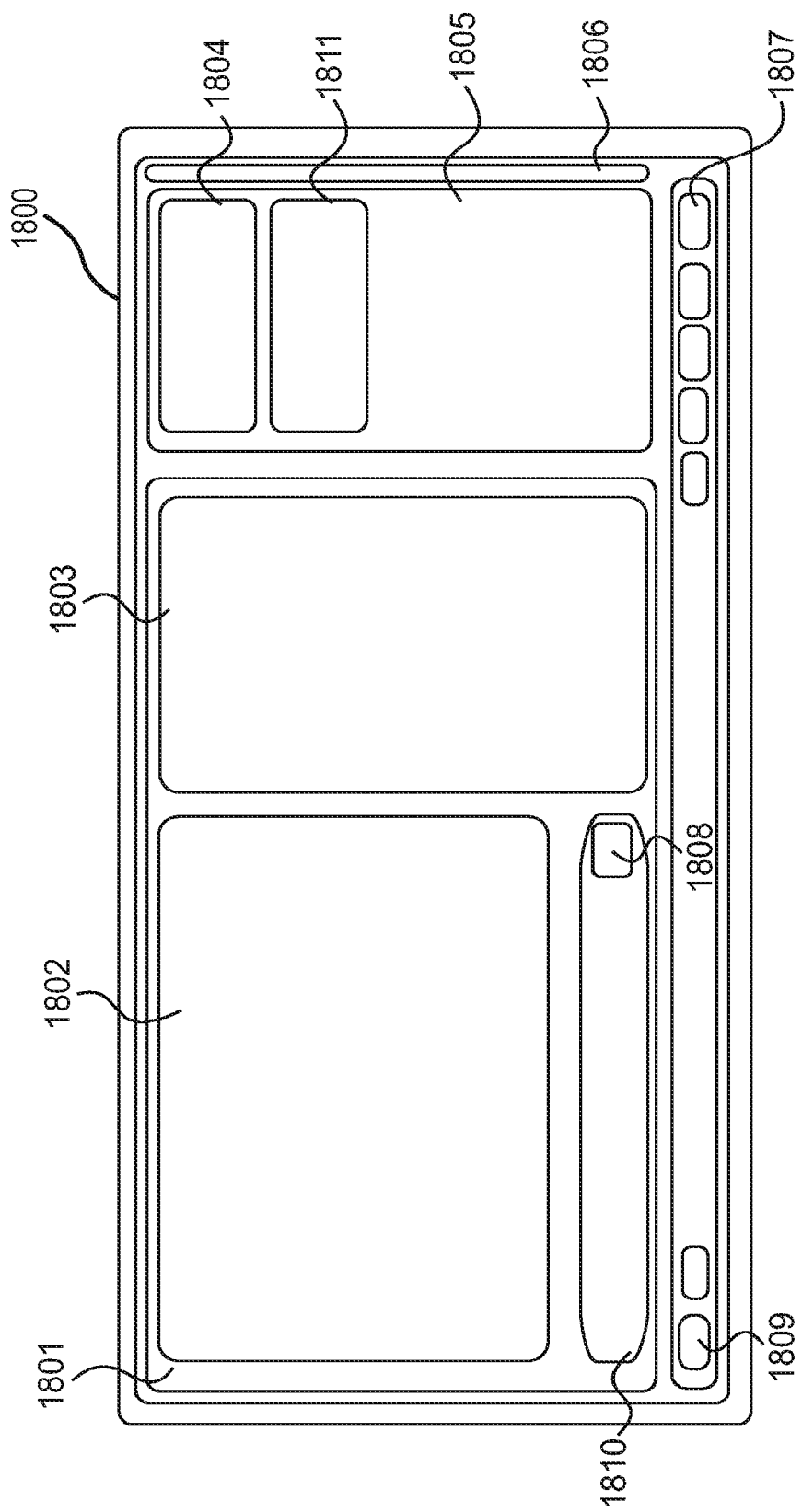
FIG. 18—Audio mode view—left top panel contains description of playlist; the left bottom panel contains controls; the middle panel contains the details of the song being played, album, release year, artist, etc.—this panel rotates and displays the list of songs in the playlist; the right panel contains social interaction, comments, recommendations, earning credits, etc.

FIG. 18 illustrates the ability of the system (1800) to playback a user's media collection, or a stream in a social setting on the media panel (1801). (1802) is the display area for video/audio playback. The information panel (1803) provides a description of the media being played. In a social network setting, other users can comment (1811) on the media being played in (1802) or in (1805). A user playing the media can respond to comments by using the reply panel (1804). Comments scroll automatically as the system receives them, and (1805) has a scrollbar (1806). (1807) refers to module specific controls. (1808) is a media playback specific control and allows the user to expand the media playback and take up the whole screen by clicking or tapping on it. Controls are found in (1810) for media. (1809) is an example of one of the many potential media function specific controls.

FIG. 19 illustrates a home device setup configuration (1900) such as that described in U.S. patent application Ser. No. 13/565,171. A component of interest here is (1901), which contains one of the replicas/copies of the user's data. This setup is critical for a configuration where the user prefers to retain a copy of the data in addition to the replicas stored in the cloud-distributed database (1911). In this (1900) setup, the system can be configured to store data not only from a user's interaction through various devices (1902)-(1910) connected to the system, but to also capture and store the data from devices that are not traditional user interface devices, such as home appliances.

This figure also illustrates a feature of the system wherein a remote mobile device, e.g., tablet (1902) and phone (1903) can be used as a remote input device or a content source for remote or local large screen displays (1904), including, but not limited to, 3D and holographic displays. In this setup, all devices sign onto the home server storage or central server (1901) as depicted in FIG. 19. The system then prompts the user on to link the devices (1902), (1903) and (1904). Among the options would be to pair up a small touch sensitive mobile device, such as a smartphone (1903) or a tablet (1902) for replicating its contents onto a large screen display (1904) or to configure the mobile device (1903) as an input device or a content source. The remote touch sensitive device (1902) and/or (1903) can act as a keyboard, touchpad, mouse, track pad, click controller, joystick, etc. Multiple devices can act as multiple game controllers in a gaming setup situation.

Replication mode can be as simple as dynamically copying the contents of the smaller device onto a larger display (via a wireless network) by multiplying the contents by the aspect ratio of the two devices, or alternatively, by making use of a smart translator embedded within (1901) that would make use of screen components that are more suited to the large screen display. An example would be replicating a simple rectangle with a boundary that is 1 pixel wide. Sending this image to the larger screen display (1904) requires 10 times the aspect ratio and the image would appear as a rectangle with a boundary that is 10 pixels wide. A smart translator would always keep the boundary at a desired pixel rate. In addition to copying the content, the remote device could also continue to work as an input device for the replicated content. One use would allow a user to switch TV channels on the remote device.

In an embodiment, this framework provides a further benefit where the remote device, by virtue of acting as a control device, can avail itself of new functionality available for display. For example, if the large screen display is upgraded from 720 p to 1080 p resolution, the remote device can continue to work properly without requiring a hardware upgrade. A software update could simply control a sub-module that is able to switch/control resolution from 720 p to 1080 p or vice a versa. This may be accomplished, for instance, as described below regarding FIG. 19.

In a separate input mode, the large screen display (1904) could be rendering content from a separate source or from a small touch sensitive device, while simultaneously enabling the small touch sensitive device to act as a combination of keyboard, touchpad, mouse, track pad, click controller, joystick, etc. This allows the remote device to become the computing brain for the large screen display without the need of a separate input device. Further, it will transform large screens into touch sensitive systems without adding costs.

FIG. 20 depicts the daily activity of the user in (2000). Components on this panel are of the plug and play type. Based on the form factor of the device, components can be added, removed or relocated based on preferences. All panels can rotate vertically and horizontally to display additional content at the equivalent screen location. Various components combine to capture the entire daily activity of the user. (2001) is a Canvas-based alarm clock with a rotating panel display. (2002) is a map panel that provides GeoLocation of meetings and events in the user's calendar for that day, along with travelling time, distance, etc. (2003) is a tentative event panel, which contains events that the user has subscribed to, but are not scheduled/imported into the user's calendar. This allows a user to make a last-minute decision as to whether to attend or to ignore certain events without cluttering up their calendar. (2005) provides a monthly panel of the current month with the ability to navigate the daily view in the current month. (2004) provides the user with a listing of the events for the day (2006), tasks for the day (2007), meetings for the day and events of the day (2008). (2009) provides the user with a 3 to 5 day weather forecast. (2010) provides the hourly breakdown of the day with meetings and tasks (2011).

The system architecture may be distinguished from other mobile operating systems, such as iOS and Android, because it may be fully browser-based and run within the boundaries of the browser. In an embodiment, the system requires that each end user first register with the system. As part of the registration process, the system creates a subscription user profile on the server side, which may permanently store any modules the user subscribes to in the mod profile in the cloud-distributed database. As opposed to traditional mobile Apps, modules may be dynamically downloaded at runtime and run within the browser. Upon successful user subscription, the system may automatically update the user profile on the server side and sync the same with the client side copy.

A user may be able to switch between modules loaded on the client side without any server interaction. Modules can also run in an offline mode without any interaction with the server. This modular architecture may be able to employ components such as those described in U.S. patent applications Ser. No. 13/565,171 and Ser. No. 61/602,241. In various embodiments, the application is able to work in an offline mode with the help of a local database, such as that described in U.S. patent application Ser. No. 13/565,171, by storing all data in the local database. Upon reestablishing an Internet connection, the client side component may automatically sync the data with the server side component without any interaction from the client or the server side.

In an embodiment, the system also has the capability to update data in all subscribed client side modules. This may be accomplished using a cloud distributed database architecture, such as that described in U.S. patent application Ser. No. 13/565,171. When a user switches the module on the client side as depicted in FIG. 8 through FIG. 11, the system can rotate in the GUI for the client requested module with the updated data. No existing architecture is able to do this since they do not support a hybrid database architecture.

For each module to work independently, the system may make use of event based messaging as opposed to threads. In this manner, the OS may service the load, as opposed to the threading model, which requires additional resources.

FIG. 25 describes the process flow of a user login and a module load and activation process of one embodiment. The server side component authenticates the user, and then retrieves the user mod profile from the cloud-distributed database. Thereafter, the system creates a mod user profile on the server side. Upon the successful creation of the user mod profile on the server side, the system creates/syncs the server side mod profile with the client side and then loads the selected module(s) in the client GUI. When the user requests a change, the system checks to see if the module is loaded on the client side and if the subscription is valid. Upon a successful check, the system loads the requested change module with the updated data.

If the user requests a subscription to a new module, the system initially updates the mod profile of the user on the server side and then syncs the new updated mod profile with the client side and then loads the requested module in the GUI.

As illustrated in FIG. 19, in an embodiment, the home setup consists of one central server (1901). Every device in FIG. 19, (1902) through (1910), upon startup connects to the Home Server (1901) and registers itself. Each device may have a client cache component, such as that described in U.S. patent application Ser. No. 13/565,171. Upon registration of the component on power-up, the data from the client cache component residing in each of the devices syncs with the Home Server or central server (1901). The Home Server (1901) in this situation acts as a server side database and then, in turn, syncs the desired data with the external cloud-distributed database (1911). The database communication between these components and the Home Server is bi-directional. The data collected in the resident databases on these devices (1902)-(1910) are imported into the Home Server or central server (1901) and then onto the external cloud database (1911) for analysis. Control instructions to these devices may be simultaneously sent by inserting these instructions into the Home Server or central server (1901) and then syncing the data to the device's resident database (1902)-(1910).

In an embodiment, this same setup can be leveraged and extended to an office setup (1912) or any other environment. The server has the ability to act as a collaboration server within the private cloud confined within the boundary marked by the Router/Switch (1910) and can work seamlessly with an external cloud database (1911), if desired. The concept of a private cloud is to provide security for personal data that the user does not wish to share with the outside world.

In an embodiment, another feature of the system is the ability to allow a touch sensitive device to act as a remote control for various other systems, thereby eliminating the need to use an external remote control and/or input devices.

The use of a smart translator maximizes the efficiency of the display in cutting out redundant clutter and displaying maximum content. This may be achieved by capturing digitized information of the Canvas element (as described in U.S. patent application Ser. No. 61/602,241) and then streaming it to various other devices with a different aspect ratio after processing the same using the smart translator that resides in the Home Server.

EXAMPLES

Cloud Based Collaborative Collage

The system allows a user to create a collage out of their own media collection that is stored in the cloud distributed file system or from media imported from a third party source such as the Internet or a local file system. Using streaming combined with a cloud-distributed database, the system enables multiple users to collaborate on manipulating media contained in a collage. The creation and publishing of a collage for social media interaction is merely an example used only for illustration purposes. The ability of the system to manipulate media in a collaborative fashion can be used for games, audio, video and any other digital media.

The system has the ability to create date-driven boards for special occasions, such as birthdays, anniversaries, etc., and task-related collages, such as charity fund raising events, etc. These boards have a collaborative feature, wherein multiple users can collaborate in building and editing the collages. In this collaborative collage mode, data is held in a temporary storage in the cloud, and the memory footprint in a digitized format is shared with all collaborators. Each collaborator has the ability to edit and save changes. The system contains a concurrency control so that changes do not get overwritten unless explicitly requested. Once published, various users can comment on the collage in a social media setting. FIG. 24 depicts the user flow for collage creation and social media interaction.

Cloud Based Collaborative Calendar—Publish and Subscribe

One of the unique features of the system is that it provides a user with the ability to publish calendars together with the ability to subscribe to separate calendars published by others. Using the published calendar grid (516) as explained in FIG. 5, a user can subscribe to multiple calendars published by other users in the cloud. Any user in the system on their own or on behalf of someone else or on behalf of an organization can create an event or multiple events in their own calendar and then publish these event(s) (in a group) as a cloud based calendar. Subscribing to these cloud-based calendars allows users the ability to import/add events from the subscribed calendars into their own calendars. Upon subscription to the cloud-based calendars, the system maintains a permanent link to the subscribed content. This link dynamically updates any events subscribed to by the users whenever there is a change. The events in the system can be meetings, tasks, social events of any kind, etc.

Upon publishing a calendar, it becomes part of the "calendar store," residing in the cloud-distributed database, and any user with access to that calendar can subscribe. Any updates to the calendar by the publisher would be broadcasted to every subscriber. Users have the option of either accepting, declining or rejecting the update. In a cloud-based collaborative computing CRM module between two users, the system allows for increased productivity through the dynamic updating of events. Subscribed calendars can be published by family and friends or by third parties, such as TV channels, sporting events, etc.

Cloud Based Collaborative Day Scheduler

The system allows a user to put together a sequence of events over a period of days. The days are simply a set of slots and are not calendar days; they are, in fact, events assigned to specific days in the calendar. The idea is to create a schedule for a specific number of days and then to repeat this schedule in a user's calendar with a set start and end date. This functionality is similar to the repeating of events provided by the standard calendar functionality in a CRM system; however, current offerings do not allow for the scheduling of days in an assigned sequence that is repeatable as we have created in this instance. This functionality is extremely useful for K-9 through K-12 students, as well as for college students where their class schedules are based on a Day 1 through Day 5 system. Starting with a weekday in a calendar, the scheduler repeats the sequence skipping weekends and specific holidays. Similar logic can be used in other aspects of life, such as for a gym schedule, a cooking schedule, or for any activity that repeats itself without regard to a traditional calendar. Days can be scheduled with set times for events (in this instance classes) by the school and then published as explained in the calendar publish and subscribe section. The number of days in the day scheduler is a configurable parameter. The system also provides the ability to skip holidays and weekends on a repeating basis if desired.

A user can also use this feature to pick and choose certain listing from a standard Television/Radio schedule, thereby creating a TV/Radio schedule of selected content of their choice. The notification features in the calendar can be turned on for reminders if desired.

Another illustration of this feature can be seen in an online school setup, where a student (an end user of the system) would be able to import events by dragging and dropping them, thereby scheduling the events at any desired time. This time placement flexibility is ideal for an online student who can schedule classes to accommodate her schedule.

Flow charts in FIGS. 21 and 22 detail the process flow for creating and editing a Day Schedule.

The system also allows a user to schedule/set an alarm by using a time clock and then save the alarm as an event in the user's calendar. The system can then use this alarm event as a trigger to schedule other events or send notifications to other systems intelligently. Examples would be sending a signal to a coffee machine to start brewing 15 minutes after the morning alarm or activating a house alarm 20 minutes after the end of the last scheduled TV show in the calendar day. This is depicted in FIG. 15.

The system allows the user to import, store and sync media in the cloud vault (distributed file system) inherently connected to the system. A user can choose to create a collage, or to access an audio/video library with pictures/images/audio/video. Flow charts in FIG. 23 depict the process flow of user interaction with the media tab.

Embodiments of the present invention described herein are exemplary only. One skilled in the art may recognize variations from the embodiments specifically described herein, which are intended to be within the scope of this disclosure. As such, the invention is limited only by the following claims. The present invention covers such variations provided that they come within the scope of the appended claims and their equivalents.

What is claimed is:

1. A data system configured to provide a modular framework to assess and manipulate information or data content across multiple device platforms synchronously comprising:

a module repository comprising at least one module at a server side;

a valid subscription service, at a client side, configured to be implemented through a browser of the multiple device platforms that provides access to interact and navigate with a content source of the at least one module;

a private cloud that can work seamlessly with an external cloud distributed database at the server side; and an architecture that allows the at least one module to delegate at least part of a or an entire computing task to the server side, wherein the content source is a local database on the subscribed client side, a remote database of the cloud distributed database, a remote stream, a remote web page or a remote script, wherein the information or data content from the content source of the at least one module is bi-directionally synchronized with the at least one module at the server side, wherein the at least one module can be requested from and uploaded back to the external cloud distributed database at the server side, wherein the at least one module provides a function dedicated to one of many aspects of functionality provided by the data system, wherein the at least one module is automatically updated with latest data in the server side driven by an event callback functionality, and wherein the at least one module is configured to be embedded within another module.

2. The data system according to claim 1, wherein the system is further configured to deliver at least one result to at least one of the multiple device platforms upon the completion of the computing task.

3. The data system according to claim 1, wherein the at least one module is configured to act as a counterpart of an application in traditional systems.

4. The data system according to claim 1, wherein the client side of the data system is configured to run within a browser.

5. The data system according to claim 1, wherein the at least one module is configured to be dynamically downloaded at runtime and run within a browser.

6. The data system according to claim 1, wherein the at least one module runs and store information or content data in an offline mode on a local database at the client side without interaction with the server side.

7. The data system according to claim 6, wherein the stored information or data content on the client side, in an online mode, is automatically synchronized with the server side without interaction from the client or server side.

8. A process for providing a modular framework in a data system to assess and manipulate information or data content across multiple device platforms synchronously comprising:

providing a module repository comprising at least one module at a server side;

implementing a valid subscription service, at a client side, through a browser of the multiple device platforms that provides access to interact and navigate with a content source of the at least one module;

a private cloud working seamlessly with an external cloud distributed database at the server side; and delegating with the at least one module at least part of a or an entire computing task to the server side via an architecture, wherein the content source is a local database on the subscribed client side, a remote database of the cloud distributed database, a remote stream, a remote web page or a remote script, wherein the information or data content from the content source of the at least one module is bi-directionally synchronized with the at least one module at the server side, wherein the at least one module can be requested from and uploaded back to the external cloud distributed database at the server side, wherein the at least one module provides a function dedicated to one of many aspects of functionality provided by the data system, wherein the at least one module is automatically updated with latest data in the server side driven by an event callback functionality, and wherein the at least one module is configured to be embedded within another module.

9. The process according to claim 8, further comprising delivering at least one result to at least one of the multiple device platforms upon the completion of the computing task.

10. The process according to claim 8, wherein the at least one module is configured to act as a counterpart of an application in traditional systems.

11. The process according to claim 8, further comprising running the client side of the data system within a browser.

12. The process according to claim 8, further comprising dynamically downloading the at least one module at runtime and running within a browser.

13. The process according to claim 8, wherein the at least one module runs and store information or content data in an offline mode on a local database at the client side without interaction with the server side.

14. The process according to claim 13, wherein the stored information or data content on the client side, in an online mode, is automatically synchronized with the server side without interaction from the client or server side.

* * * * *